(12) United States Patent
Mayo et al.

(10) Patent No.: US 8,696,100 B1
(45) Date of Patent: Apr. 15, 2014

(54) PHASE CHANGE INK CONTAINING SYNERGIST FOR PIGMENT DISPERSION

(71) Applicant: Xerox Corporation, Norwalk, CT (US)

(72) Inventors: James D. Mayo, Mississauga (CA); C. Geoffrey Allen, Waterdown (CA); Salma Falah Toosi, Mississauga (CA); Mihaela Maria Birau, Mississauga (CA); Biby Esther Abraham, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/633,596

(22) Filed: Oct. 2, 2012

(51) Int. Cl.
*G01D 11/00* (2006.01)
(52) U.S. Cl.
USPC .......................................................... 347/99
(58) Field of Classification Search
USPC .................... 347/44, 88, 95, 96, 99, 100, 101;
522/42, 84, 85; 523/160.161; 106/31.6,
106/31.13, 31.27, 31.78
See application file for complete search history.

(56) References Cited

U.S. PATENT DOCUMENTS

| | | | |
|---|---|---|---|
| 3,653,932 | A | 4/1972 | Berry et al. |
| 4,251,824 | A | 2/1981 | Hara et al. |
| 4,390,369 | A | 6/1983 | Merritt et al. |
| 4,410,899 | A | 10/1983 | Haruta et al. |
| 4,412,224 | A | 10/1983 | Sugitani |
| 4,484,948 | A | 11/1984 | Merritt et al. |
| 4,490,731 | A | 12/1984 | Vaught |
| 4,532,530 | A | 7/1985 | Hawkins |
| 4,601,777 | A | 7/1986 | Hawkins et al. |
| 4,684,956 | A | 8/1987 | Ball |
| 4,830,671 | A | 5/1989 | Frihart et al. |
| 4,851,045 | A | 7/1989 | Taniguchi |
| 4,889,560 | A | 12/1989 | Jaeger et al. |
| 4,889,761 | A | 12/1989 | Titterington et al. |
| 5,006,170 | A | 4/1991 | Schwarz et al. |
| 5,151,120 | A | 9/1992 | You et al. |
| 5,194,638 | A | 3/1993 | Frihart et al. |
| 5,195,430 | A | 3/1993 | Rise |
| 5,221,335 | A | 6/1993 | Williams et al. |
| 5,372,852 | A | 12/1994 | Titterington et al. |
| 5,389,958 | A | 2/1995 | Bui et al. |
| 5,496,879 | A | 3/1996 | Griebel et al. |
| 5,597,856 | A | 1/1997 | Yu et al. |

(Continued)

FOREIGN PATENT DOCUMENTS

| | | |
|---|---|---|
| EP | 206286 | 12/1986 |
| GB | 2238792 | 6/1991 |

(Continued)

OTHER PUBLICATIONS

James D. Mayo, et al., U.S. Appl. No. 13/633,608, filed Oct. 2, 2012, "Phase Change Inks Containing Novel Synergist," not yet published, 59 pages, 2 drawing sheets.

*Primary Examiner* — Kristal Feggins
(74) *Attorney, Agent, or Firm* — Marylou J. Lavoie

(57) ABSTRACT

A phase change ink composition including a pigment; a carrier; a dispersant; and a synergist, (a) wherein, for a given sample of the synergist, about 80 to about 100 percent of the sample has a volume average particle diameter of about 50 to about 200 nanometers; (b) wherein the synergist has a surface area of about 30 to about 100 $m^2$/gram; and (c) wherein the synergist has a density of above about 0.6 to about 2 grams/$cm^3$.

20 Claims, 6 Drawing Sheets

(56) References Cited

U.S. PATENT DOCUMENTS

| | | |
|---|---|---|
| 5,750,604 A | 5/1998 | Banning et al. |
| 5,780,528 A | 7/1998 | Titterington et al. |
| 5,782,966 A | 7/1998 | Bui et al. |
| 5,783,658 A | 7/1998 | Banning et al. |
| 5,827,198 A | 10/1998 | Kassal |
| 5,830,942 A | 11/1998 | King et al. |
| 5,919,839 A | 7/1999 | Titterington et al. |
| 6,174,937 B1 | 1/2001 | Banning et al. |
| 6,221,137 B1 | 4/2001 | King et al. |
| 6,255,432 B1 | 7/2001 | Evans et al. |
| 6,309,453 B1 | 10/2001 | Banning et al. |
| 6,472,523 B1 | 10/2002 | Banning et al. |
| 6,476,219 B1 | 11/2002 | Duff et al. |
| 6,547,380 B2 | 4/2003 | Smith et al. |
| 6,576,747 B1 | 6/2003 | Carlini et al. |
| 6,576,748 B1 | 6/2003 | Carlini et al. |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,696,552 B2 | 2/2004 | Mayo et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,860,930 B2 | 3/2005 | Wu et al. |
| 6,906,118 B2 | 6/2005 | Goodbrand et al. |
| 6,958,406 B2 | 10/2005 | Banning et al. |
| 7,053,227 B2 | 5/2006 | Jaeger et al. |
| 7,381,831 B1 | 6/2008 | Banning et al. |
| 7,407,539 B2 | 8/2008 | Wu et al. |
| 7,427,323 B1 | 9/2008 | Birau et al. |
| 7,780,774 B2 | 8/2010 | Wong et al. |
| 7,973,186 B1 | 7/2011 | Goredema et al. |
| 8,002,399 B2 * | 8/2011 | Turek et al. ............... 347/99 |
| 8,579,428 B2 * | 11/2013 | Banning et al. ............. 347/99 |
| 2002/0065335 A1 * | 5/2002 | Noguchi et al. ............ 522/84 |
| 2011/0152397 A1 * | 6/2011 | Breton et al. ............... 522/42 |

FOREIGN PATENT DOCUMENTS

| | | |
|---|---|---|
| GB | 2290793 | 1/1996 |
| GB | 2294939 | 5/1996 |
| GB | 2305670 | 4/1997 |
| GB | 2305928 | 4/1997 |
| WO | WO 94/04619 | 3/1994 |
| WO | WO 94/14902 | 7/1994 |
| WO | WO 95/04760 | 2/1995 |
| WO | WO 96/14364 | 5/1995 |
| WO | WO 97/12003 | 4/1997 |
| WO | WO 97/13816 | 4/1997 |
| WO | WO 9733943 | 9/1997 |

* cited by examiner

PHASE CHANGE INK CONTAINING SYNERGIST FOR PIGMENT DISPERSION

RELATED APPLICATIONS

Commonly assigned U.S. patent application Ser. No. 13/633,608 entitled "Phase Change Inks Containing Novel Synergist"), filed concurrently herewith, which is hereby incorporated by reference herein in its entirety, describes phase change inks including a copper phthalocyanine synergist having a carboxylic acid group thereon.

BACKGROUND

Disclosed herein is a phase change ink composition including a synergist for pigment dispersion. More particularly disclosed is a phase change ink composition comprising a pigment; a carrier; a dispersant; and a synergist, (a) wherein, for a given sample of the synergist, about 80 to about 100 percent of the sample has a volume average particle diameter of about 50 to about 200 nanometers; (b) wherein the synergist has a surface area of about 30 to about 100 $m^2$/gram; and (c) wherein the synergist has a density of above about 0.6 to about 2 grams/$cm^3$.

In general, phase change inks (sometimes referred to as solid inks or "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes.

The colorants can also include pigments, as disclosed in, for example, U.S. Pat. No. 5,221,335, the disclosure of which is totally incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Ink jetting devices are known in the art, and thus extensive description of such devices is not required herein. As described in U.S. Pat. No. 6,547,380, which is hereby incorporated herein by reference in its entirety, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, which is hereby incorporated herein by reference in its entirety, the image is applied by jetting appropriately colored inks during four to eighteen rotations (incremental movements) of a substrate (an image receiving member or intermediate transfer member) with respect to the ink jetting head, i.e., there is a small translation of the print head with respect to the substrate in between each rotation. This approach simplifies the print head design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Thermal ink jet processes are well known and are described, for example, in U.S. Pat. Nos. 4,601,777, 4,251,824, 4,410,899, 4,412,224 and 4,532,530, the disclosures of each of which are hereby incorporated herein.

As noted, ink jet printing processes may employ inks that are solid at room temperature and liquid at elevated temperatures. For example, U.S. Pat. No. 4,490,731, which is hereby incorporated by reference herein, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of non-printing without the danger of nozzle clogging, even without capping the nozzles.

Examples of the phase change inks herein are inks that include an ink vehicle that is solid at temperatures of about 23° C. to about 27° C., for example room temperature, and specifically are solid at temperatures below about 60° C. However, the inks change phase upon heating, and are in a molten state at jetting temperatures. Thus, the inks have a viscosity of from about 1 to about 20 centipoise (cp), for example from about 5 to about 15 cp or from about 8 to about 12 cp, at an elevated temperature suitable for ink jet printing, for example temperatures of from about 60° C. to about 150° C.

In this regard, the inks herein may be either low energy inks or high energy inks. Low energy inks are solid at a temperature below about 40° C. and have a viscosity of from about 1 to about 20 centipoise such as from about 5 to about 15 centipoise, for example from about 8 to about 12 cp, at a jetting temperature of from about 60° C. to about 100° C. such as about 80° C. to about 100° C., for example from about 90° C. to about 100° C. High energy inks are solid at a temperature below 40° C. and have a viscosity of from about 5 to about 15 centipoise at a jetting temperature of from about 100° C. to about 180° C., for example from about 120° C. to about 160° C. or from about 125° C. to about 150° C.

While certain colorants suitable for use in phase change inks are known, an increase in the range of colorants suitable for use in phase change inks is desirable. Current phase change inks often comprise custom dye colorants. These custom dyes are very expensive. It is desired to replace custom dye colorants with less expensive colorants. Pigments are typically much less expensive than dye colorants. In addition, pigments can offer improved colorfastness over dyes, reduce or eliminate migration issues, and improve ink robustness characteristics.

Pigmented phase change ink compositions that include various dispersants are also known. However, the use of certain polymeric dispersants can be disfavored in some phase change inks for a variety of reasons. The problems caused by the use of certain polymeric dispersants include a negative effect on rheological properties of the ink, such as non-Newtonian behavior and an increase in viscosity.

Pigment particles in the ink must be properly dispersed and stabilized such that the ink can be reliably jetted without the clogging of the print heads by the pigment particles. Polymeric dispersants in phase change inks can affect drop formation, because polymers will tend to form filaments which affect the formation of small drop sizes. Most of the commercially available dispersants were designed for aqueous based and solvent based ink systems and are not compatible with hydrophobic wax based inks. Many of the commercially available compounds that can effect dispersion of pigments in low polarity inks (usually solvent-based) are liquids or pastes and are not designed to chemically withstand the excessive temperatures in the printer (over 100° C., typically 115° C. to 120° C.) for long periods of time. Furthermore, the use of polymers in solid ink can be disfavored for the following reasons: a) they can have a negative impact on rheological properties producing non-Newtonian behavior and an increase in viscosity, and b) they can affect drop formation during jetting, polymers will tend to form filaments which might affect the formation of small drop sizes.

Dispersion of pigments in solid ink formulations can be particularly difficult owing to the high temperatures incurred in the printer (such as greater than 100° C.), the potential for multiple freeze-thaw cycles the ink might undergo, and the non-polar nature of the ink vehicle.

U.S. Pat. No. 7,780,774, of Raymond W. Wong, et al., which is hereby incorporated by reference herein in its entirety, describes in the Abstract thereof a method of making a phase change ink composition includes adding to a device with a stirring element at least one pigment, at least one dispersant and at least one synergist, processing the device at an elevated temperature and at a stirring rate to wet the at least one pigment to obtain an ink concentrate, and mixing the ink concentrate with an ink vehicle to obtain the ink composition. The device may be an extruder, an attritor or the like. The method allows for the reduction in the amount of dispersant to include in the ink.

While known compositions and processes are suitable for their intended purposes, a need remains for improved phase change ink compositions. There is further a need for an improved colored phase change ink composition where the pigment particles are stable and well dispersed in the ink. There is further a need for phase change ink compositions including improved synergists that are chemically stable, compatible with the phase change ink formulation and that can provide stabilization of pigment particles in phase change inks over long periods of time at high temperatures. There remains a need for pigmented phase change inks with improved image quality, improved light fastness, and reduced show through. A need also remains for pigmented phase change inks where the colorants have reduced agglomeration and settling in the ink when the ink is exposed to high temperatures for prolonged periods. A need also remains for pigmented phase change inks with reduced clogging of the jets in the print head. There further remains a need for pigmented phase change ink compositions where dispersion of pigments in the solid ink compositions is stable under high temperature conditions incurred in the printer (such as greater than 100° C.), that is stable throughout multiple freeze-thaw cycles the ink can undergo, and that is compatible and stable in the non-polar ink vehicle.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change ink composition comprising a pigment; a carrier; a dispersant; and a synergist, (a) wherein, for a given sample of the synergist, about 80 to about 100 percent of the sample has a volume average particle diameter of about 5 to about 200 nanometers; (b) wherein the synergist has a surface area of about 30 to about 100 m²/gram; and (c) wherein the synergist has a density of above about 0.6 to about 2 grams/cm³.

Also described is a method for preparing a phase change ink composition comprising combining a pigment, a carrier; a dispersant; and a synergist, (a) wherein, for a given sample of the synergist, about 80 to about 100 percent of the sample has a volume average particle diameter of about 5 to about 200 nanometers; (b) wherein the synergist has a surface area of about 30 to about 100 m²/gram; and (c) wherein the synergist has a density of above about 0.6 to about 2 grams/cm³, to produce a phase change ink composition.

Also described is a method comprising incorporating into an ink jet printing apparatus a phase change ink composition comprising a pigment a carrier; a dispersant; and a synergist, (a) wherein, for a given sample of the synergist, about 80 to about 100 percent of the sample has a volume average particle diameter of about 5 to about 200 nanometers; (b) wherein the synergist has a surface area of about 30 to about 100 m²/gram; and (c) wherein the synergist has a density of above about 0.6 to about 2 grams/cm³; melting the ink composition; and causing droplets of the melted ink to be ejected in an imagewise pattern onto a substrate.

Also described is an ink jet printer stick or pellet containing a phase change ink composition comprising a pigment a carrier; a dispersant; and a synergist, (a) wherein, for a given sample of the synergist, about 80 to about 100 percent of the sample has a volume average particle diameter of about 5 to about 200 nanometers; (b) wherein the synergist has a surface area of about 30 to about 100 m²/gram; and (c) wherein the synergist has a density of above about 0.6 to about 2 grams/cm³.

DETAILED DESCRIPTION

Figure 1:
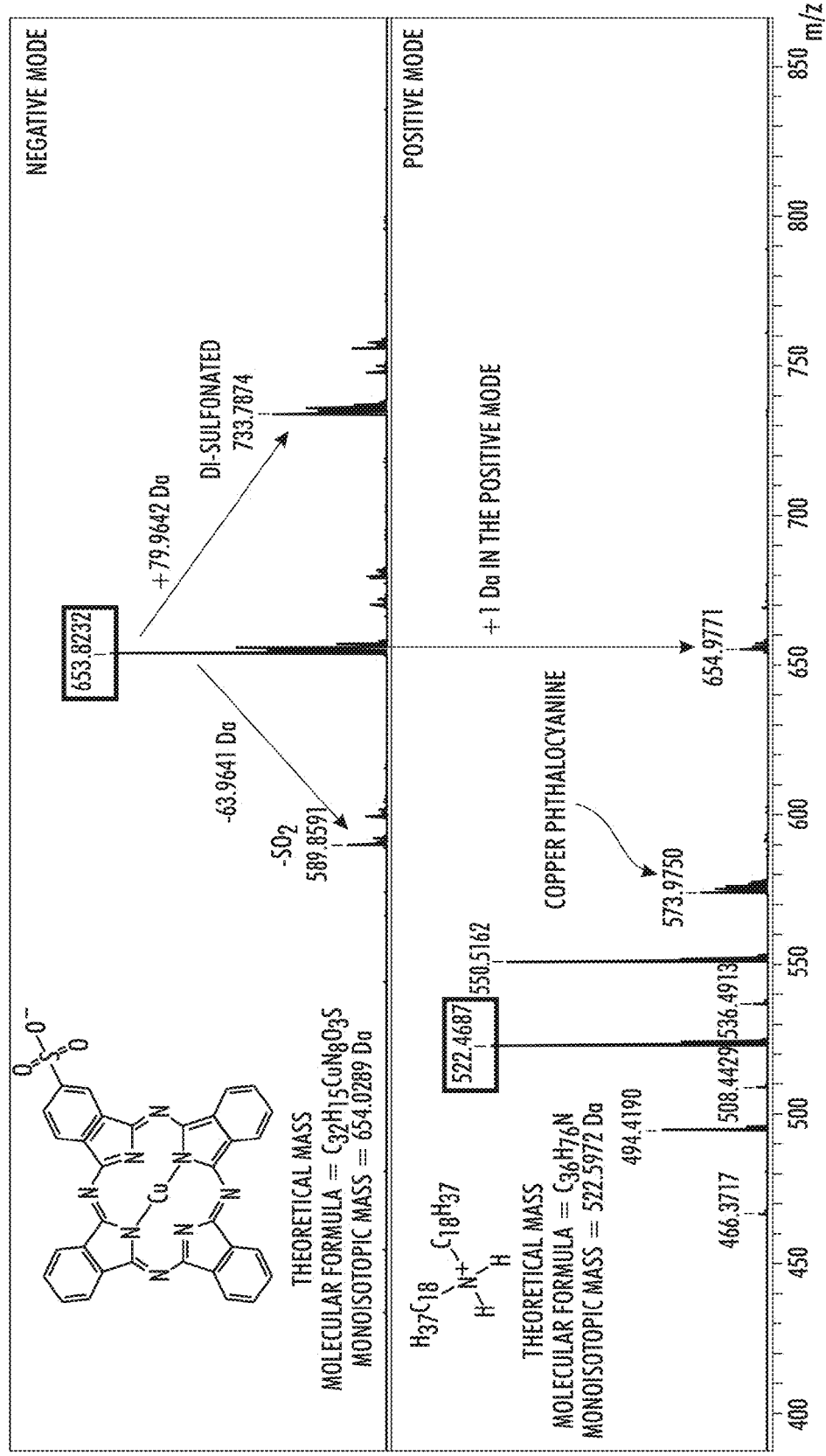
FIG. 1 is a graph showing a MALDI-TOF analysis of a synergist suitable for pigmented phase change inks in accordance with the present disclosure.

A phase change ink composition is provided. In embodiments, the phase change ink composition comprises a pigment; a carrier; a dispersant; and a synergist, (a) wherein, for a given sample of the synergist, about 80 to about 100 percent of the sample has a volume average particle diameter of about 5 to about 200 nanometers; (b) wherein the synergist has a surface area of about 30 to about 100 m²/gram; and (c) wherein the synergist has a density of above about 0.6 to about 2 grams/cubic centimeter (cm³).

Synergist.

In embodiments, the phase change ink composition herein comprises a synergist having the formula

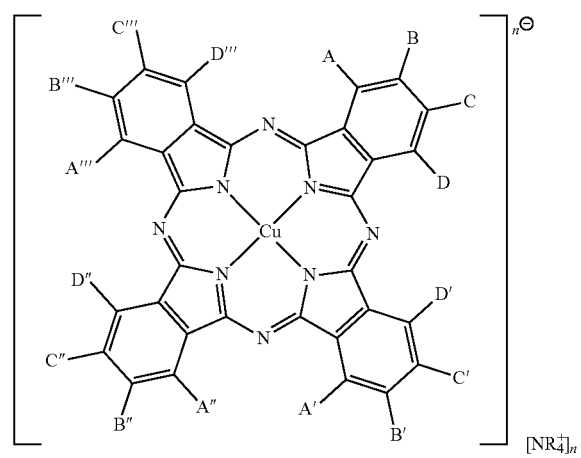

wherein at least one of A, B, C, and D, A', B', C', and D', A'', B'', C'', and D'', A''', B''', C''', and D''' are present, and wherein, B, C, and D, A', B', C', and D', A'', B'', C'', and D'', A''', B''', C''', and D''', are each independently selected from the group consisting of hydrogen, SO₃H, and SO₃⁻, wherein, in certain embodiments, at least one of these substituents is SO₃⁻, wherein, in certain other embodiments, only one of A, B, C, and D, A', B', C', and D', A'', B'', C'', and D'', A''', B''', C''', and D''' is substituted, wherein in other embodiments, only of A, B, C, and D, A', B', C', and D', A'', B'', C'', and D'', A''', B''', C''', and D''' is substituted with a group other than hydrogen, and in further embodiments only one of A, B, C, and D, A', B', C', and D', A'', B'', C'', and D'', A''', B''', C''', and D''' is substituted with SO₃⁻;

wherein, in certain other embodiments, one (and only one) of A, B, C, or D is substituted with a group other than hydrogen, and wherein in certain embodiments that group is an SO₃⁻ group, and only one of A', B', C', and D', A'', B'', C'' is substituted with a group other than hydrogen, and wherein in certain embodiments that group is an $SO_3^-$ group, and wherein only one of A''', B''', C''', and D''' is substituted with a group other than hydrogen, and wherein in certain embodiments that group is an $SO_3^-$ group, wherein n is any suitable integer, wherein n indicates the charge on the phthalo portion of the structure and n indicates the number of $NR_4^+$ components, in embodiments, wherein, n is mixture of from 0, 1, 2, 3, 4, or greater, wherein, in embodiments, n is a mixture of 0, 1, and 2;

wherein, in embodiments, the synergist comprises a mixture of compounds wherein n is a mixture of from 0, 1, 2, 3, 4, or greater, or wherein n is a mixture of 0, 1, and 2.

wherein R is independently selected from hydrogen, an alkyl group, including linear, branched, saturated, unsaturated, cyclic, substituted, and unsubstituted alkyl groups, and wherein hetero atoms, such as oxygen, nitrogen, sulfur, silicon, phosphorus, boron, may optionally be present in the alkyl group, having from about 1 to about 50 carbon atoms, wherein, if substituted, substitutions can be alkyl or phenyl, and wherein, in embodiments, R is an alkyl chain having 18 carbon atoms;

and wherein, in embodiments, the synergist comprises mixtures of compounds wherein n is 0, 1, 2, 3, 4 or greater; and wherein, in embodiments, n is a mixture of from 0, 1, 2, 3, 4, or greater, wherein, in embodiments, n is a mixture of 0, 1, and 2.

Thus, in embodiments, where there are any SO3- substituents, that is, if any of A, B, C, and D, A', B', C', and D', A'', B'', C'', and D'', A''', B''', C''', and D''' are $SO_3^-$, there will be an equal number of $$[NR_4^+]_n$$

to balance the $SO_3^-$ substituents; that is, n will be equal to the number of $SO_3^-$ substituents.

In embodiments, if n is zero, there is no charge on the phthalo portion of the molecule; the substituents are hydrogen or $SO_3H$; that is, in embodiments, A, B, C, and D, A', B', C', and D', A'', B'', C'', and D'', A''', B''', C''', and D''' are each independently selected from hydrogen and $SO_3H$.

In embodiments, if n is 1, there is one cation, and one anion, in embodiments, one $NR_4^+$ and one $SO_3^-$ substituent on the phthalo portion of the molecule, that is, one of A, B, C, and D, A', B', C', and D', A'', B'', C'', and D'', A''', B''', C''', or D''' is $SO_3^-$, giving the phthalo portion of the molecule a negative charge.

In embodiments, if n is 2, there are two cations and two anions, and the charge on the phthalo portion of the molecule is $2^-$.

The present inventors have discovered that while extensive analytical characterization revealed largely similar structures for two synergists, each having the formula

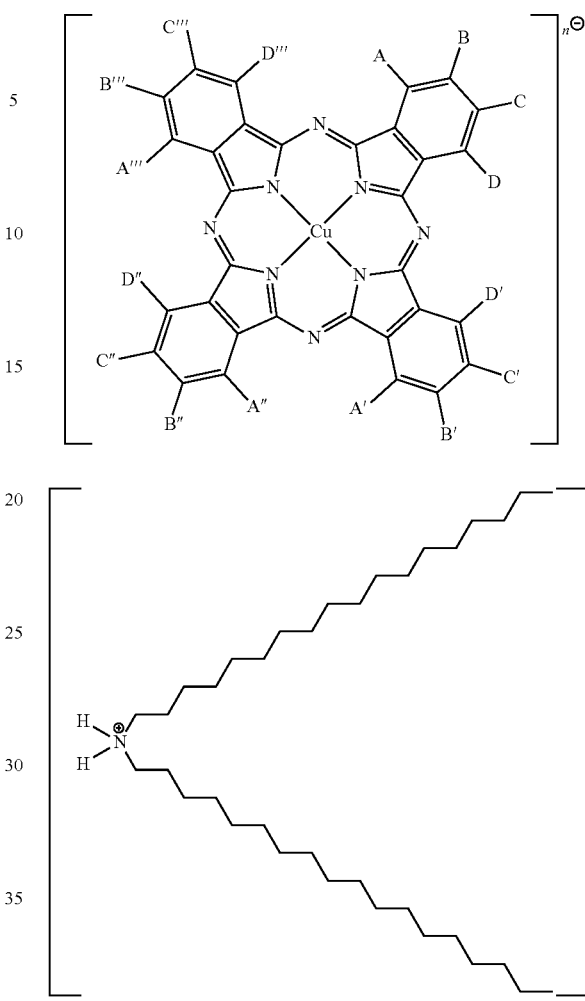

wherein A, B, C, and D, A', B', C', and D', A'', B'', C'', and D'', A''', B''', C''', and D''', $n^-$ and n are as described above, each consisting of an isomeric mixture of a substituted copper phthalocyanine, and while X-Ray powder diffraction (XRPD) for the two materials were also largely identical, meaning there were almost no differences in polymorphism, thermal stability of two separate inks made with these seemingly near identical synergists were significantly different. It has been surprisingly discovered that the synergist as described herein provides an improved synergist for phase change ink compositions as compared with previously available phase change ink compositions. In embodiments, a specific copper phthalocyanine derivative provided herein is especially effective for use as a synergist in solid inks.

In embodiments, a copper phthalocyanine derivative is employed as a synergist for improving dispersion stability of pigmented phase change inks, in embodiments cyan solid inks. Phthalocyanines form large networks or aggregates by means of pi-stacking. Interruption of this pi-stacked network with a substituted phthalocyanine (synergist) at once minimizes the size of the aggregates, and enables bonding of amine based dispersants allowing for greater stability of the ink.

The phase change ink composition includes a synergist, (a) wherein, for a given sample of the synergist, about 10 to about 100 percent, or about 50 to about 100 percent, or about 80 to about 100 percent, or about 80 to about 90 percent of a given sample of synergist has a volume average particle diameter of about 1 to about 500 nanometers, or about 10 to about 300 nanometers, or about 50 to about 200 nanometers; (b) wherein the synergist has a surface area of about 1 to about 200 m²/gram, or about 10 to about 100 m²/gram, or about 30 to about 100 m²/gram, or about 20 to about 70 m²/gram; and (c) wherein the synergist has a density of above about 0.05 to about 5 grams/cm³, or about 0.5 to about 3 grams/cm³, or about 0.6 to about 2 grams/cm³.

In specific embodiments, the phase change ink composition includes a synergist, (a) wherein, for a given sample of the synergist, about 80 to about 100 percent of the sample has a volume average particle diameter of about 5 to about 200 nanometers; (b) wherein the synergist has a surface area of about 30 to about 100 m²/gram; and (c) wherein the synergist has a density of above about 0.6 to about 2 grams/cm³.

In embodiments, a pigmented phase change ink composition is provided including a specific derivatized copper phthalocyanine compound which acts as a synergist for pigmented phase change ink dispersions, in embodiments for cyan pigmented phase change ink dispersions.

In embodiments, the synergist is a compound of the formula

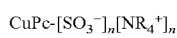

wherein CuPc is a compound of the formula

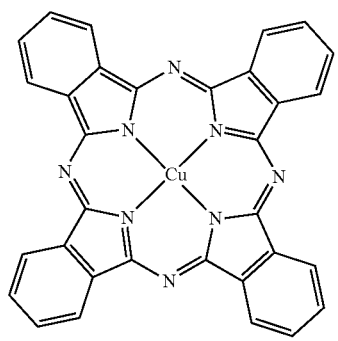

wherein R is independently selected from hydrogen, an alkyl group, including linear, branched, saturated, unsaturated, cyclic, substituted, and unsubstituted alkyl groups, and wherein hetero atoms, such as oxygen, nitrogen, sulfur, silicon, phosphorus, boron, may optionally be present in the alkyl group, having from about 1 to about 50 carbon atoms, wherein, if substituted, substitutions can be alkyl or phenyl, and wherein, in embodiments, R is an alkyl chain having 18 carbon atoms;

wherein n represents the degree of sulfonation on CuPc; and wherein, in embodiments, n is any suitable integer, and wherein, in embodiments, n is mixture of from 0, 1, 2, 3, 4, or greater, wherein, in embodiments, n is a mixture of 0, 1, and 2.

In a specific embodiment, the synergist is a compound of the formula

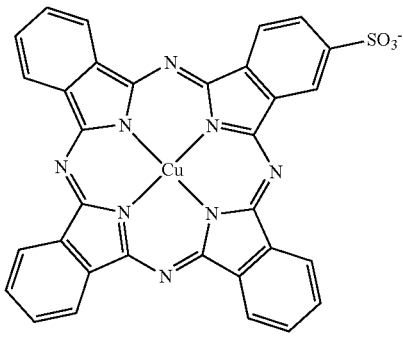

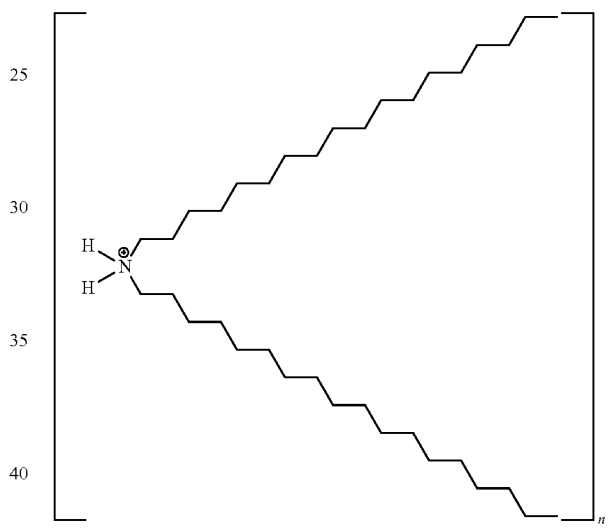

wherein n is a mixture of from 0, 1, 2, 3, 4, or greater, wherein, in embodiments, n is a mixture of 0, 1, and 2.

In a specific embodiment, the synergist is a compound of the formula

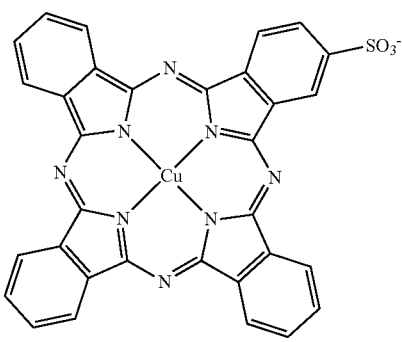

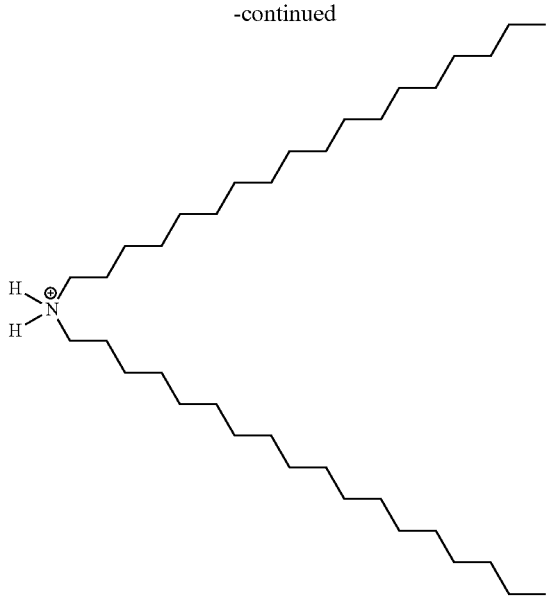

The synergist can be provided in the phase change ink composition in any suitable or desired amount. In embodiments, the synergist can be present in an amount of from about 1 to about 300 percent, or from about 10 to about 200 percent, or from about 30 to about 150 percent total synergist, based on the total weight of the pigment in the phase change ink composition.

Colorant.

The phase change ink compositions can include any suitable pigment as colorant. If desired, a dye or other material can be added, in embodiments as taggants for security or other purposes. The phase change ink compositions can include a dye, and, if desired, any suitable or desired additional colorant selected from the group consisting of traditional dyes, pigments, and mixtures and combinations thereof; and optionally, an additional colorant that is a second, different modified naturally-derived colorant. If more than one colorant is included, the total amount of colorant present in the phase change ink composition can be any desired or effective amount to obtain the desired color or hue, in embodiments from about 0.1 to about 50 percent, or from about 0.1 percent to about 20 percent total colorant by weight based on the total weight of the phase change ink composition.

Any desired or effective colorant can be employed as the optional additional colorant in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon® Red 492 (BASF); Orasol® Red G (Pylam Products); Direct Brilliant Pink B (Oriental Giant Dyes); Direct Red 3BL (Classic Dyestuffs); Supranol® Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol® Brilliant Yellow 4GF (Clariant); Cibanone Yellow 2G (Classic Dyestuffs); Orasol® Black RLI (BASF); Orasol® Black CN (Pylam Products); Savinyl Black RLSN (Clariant); Pyrazol Black BG (Clariant); Morfast® Black 101 (Rohm & Haas); Diaazol Black RN (ICI); Thermoplast® Blue 670 (BASF); Orasol® Blue GN (Pylam Products); Savinyl Blue GLS (Clariant); Luxol Fast Blue MBSN (Pylam Products); Sevron Blue SGMF (Classic Dyestuffs); Basacid® Blue 750 (BASF); Keyplast Blue (Keystone Aniline Corporation); Neozapon® Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen® Blue FF-4012 (BASF); Fastol® Black BR (C.I. Solvent Black 35) (Chemische Fabriek Triade BV); Morton Morplas Magenta 36 (C.I. Solvent Red 172); metal phthalocyanine colorants, such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are hereby incorporated by reference herein in their entireties, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint® Orange X-38, uncut Reactint® Blue X-17, Solvent Yellow 162, Acid Red 52, Solvent Blue 44, and uncut Reactint® Violet X-80.

Pigments are also suitable optional additional colorants for the phase change ink. Examples of suitable pigments include PALIOGEN® Violet 5100 (BASF); PALIOGEN® Violet 5890 (BASF); HELIOGEN® Green L8730 (BASF); LITHOL® Scarlet D3700 (BASF); SUNFAST® Blue 15:4 (Sun Chemical); Hostaperm® Blue B2G-D (Clariant); a C.I. Pigment Blue 15:3 pigment available from Clariant GmbH; SPECTRA® PAC C Blue 15:4 (Sun Chemical); Permanent Red P-F7RK; HostapermC) Violet BL (Clariant); LITHOL® Scarlet 4440 (BASF); Bon Red C (Dominion Color Company); ORACET® Pink RF (BASF); PALIOGEN® Red 3871 K (BASF); SUNFAST® Blue 15:3 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA® PAC C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue GLO (BASF); PALIOGEN® Blue 6470 (BASF); Sudan Orange G (Aldrich); Sudan Orange 220 (BASF); PALIOGEN® Orange 3040 (BASF); PALIOGEN® Yellow 152, 1560 (BASF); LITHOL® Fast Yellow 0991 K (BASF); PALIOTOL® Yellow 1840 (BASF); NOVOPERM® Yellow FGL (Clariant); Ink Jet Yellow 4G VP2532 (Clariant); Toner Yellow HG (Clariant); Lumogen® Yellow D0790 (BASF); Suco-Yellow L1250 (BASF); Suco-Yellow D1355 (BASF); Suco Fast Yellow D1355, D1351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL® Pink D4830 (BASF); CINQUASIA® Magenta (DU PONT); PALIOGEN® Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are hereby totally incorporated by reference herein in their entireties.

Pigment.

In specific embodiments, the phase change ink compositions herein are pigmented phase change ink compositions. The phase change ink compositions herein can include one or more pigments as the colorant and in specific embodiments do not include any other non-pigment colorant. Alternately, the phase change ink compositions herein can include one or more pigments and an additional colorant selected from any suitable or desired colorant including dyes, pigments, mixtures thereof, and the like. In embodiments, the pigment is selected from the group consisting of metal phthalocyanine, metal-free phthalocyanine, and mixtures and combinations thereof. In certain embodiments, the phase change ink composition includes a pigment selected from the group consisting of cyan, green, blue, black, carbon black, Pigment Blue, copper phthalocyanine, and mixtures and combinations thereof. In other embodiments, the pigment is selected from the group consisting of cyan, green, blue, black, carbon black, C.I. Pigment Blue 15:0, C.I Pigment Blue 15:1, C.I. Pigment Blue 15:2, C.I. Pigment Blue 15:3, C.I. Pigment Blue 15:4, C.I. Pigment Blue 15:5, C.I. Pigment Blue 15:6, C.I. Pigment Green 7, C.I. Pigment Green 36, C.I. Pigment Black 7, copper phthalocyanine, and mixtures and combinations thereof. In a specific embodiment, the pigment is a cyan pigment.

Suitable pigments that can be used in embodiments herein include, for example, PALIOGEN® Violet 5100 (commercially available from BASF); PALIOGEN® Violet 5890 (commercially available from BASF); HELIOGEN® Green L8730 (commercially available from BASF); LITHOL® Scarlet D3700 (commercially available from BASF); SUNFAST® Blue 15:4 (commercially available from Sun Chemical); HOSTAPERM® Blue B2G-D (commercially available from Clariant); a C.I. Pigment Blue 15:3 pigment available from Clariant GmbH; Permanent Red P-F7RK; HOSTAPERM® Violet BL (commercially available from Clariant); LITHOL® Scarlet 4440 (commercially available from BASF); Bon Red® C (commercially available from Dominion Color Company); ORACET® Pink RF (commercially available from BASF); PALIOGEN® Red 3871 K (commercially available from BASF); SUNFAST® Blue 15:3 (commercially available from Sun Chemical); PALIOGEN® Red 3340 (commercially available from BASF); SUNFAST® Carbazole Violet 23 (commercially available from Sun Chemical); LITHOL® Fast Scarlet L4300 (commercially available from BASF); SUNBRITE® Yellow 17 (commercially available from Sun Chemical); HELIOGEN® Blue L6900, L7020 (commercially available from BASF); SUNBRITE® Yellow 74 (commercially available from Sun Chemical); SPECTRA® PAC C Orange 16 (commercially available from Sun Chemical); HELIOGEN® Blue K6902, K6910 (commercially available from BASF); SUNFAST® Magenta 122 (commercially available from Sun Chemical); HELIOGEN® Blue D6840, D7080 (commercially available from BASF); Sudan Blue OS (commercially available from BASF); NEOPEN® Blue FF4012 (commercially available from BASF); PV Fast Blue B2GO1 (commercially available from Clariant); IRGALITE® Blue BCA (commercially available from BASF); PALIOGEN® Blue 6470 (commercially available from BASF); Sudan Orange G (commercially available from Aldrich), Sudan Orange 220 (commercially available from BASF); PALIOGEN® Orange 3040 (BASF); PALIOGEN® Yellow 152, 1560 (commercially available from BASF); LITHOL® Fast Yellow 0991 K (commercially available from BASF); PALIOTOL® Yellow 1840 (commercially available from BASF); NOVOPERM® Yellow FGL (commercially available from Clariant); Ink Jet Yellow 4G VP2532 (commercially available from Clariant); Toner Yellow HG (commercially available from Clariant); Lumogen® Yellow D0790 (commercially available from BASF); Suco-Yellow L1250 (commercially available from BASF); Suco-Yellow D1355 (commercially available from BASF); Suco Fast Yellow D1 355, D1 351 (commercially available from BASF); HOSTAPERM® Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL® Pink D4830 (commercially available from BASF); CINQUASIA® Magenta (commercially available from DU PONT); PALIOGEN® Black L0084 (commercially available from BASF); Pigment Black K801 (commercially available from BASF); and carbon blacks such as REGAL® 330 (commercially available from Cabot), Nipex® 150 (commercially available from Degussa) Carbon Black 5250 and Carbon Black 5750 (commercially available from Columbia Chemical), and the like, as well as mixtures thereof.

The pigment can be provided in the phase change ink composition in any suitable or desired amount. In embodiments, the pigment can be present in an amount of from about 0.1 to about 20 percent, or from about 0.5 percent to about 5 percent, or about 0.75 to about 3 percent total pigment, based on the total weight of the phase change ink composition.

Carrier.

The phase change ink compositions herein can further include an ink vehicle or carrier. The phase change ink compositions can include any suitable ink vehicle such as paraffins, microcrystalline waxes, polyethylene waxes, ester waxes, amides, fatty acids and other waxes or waxy materials, fatty amide containing materials, sulfonamide materials, resinous materials made from different natural sources (tall oil rosins and rosin esters, for example), and many synthetic resins, oligomers, polymers, and copolymers such as further discussed below.

In embodiments, the phase change ink compositions herein include a polyalkylene wax. In specific embodiments, the wax is a polymethylene wax, a polyethylene wax, or a mixture of combination thereof.

In certain embodiments, the phase change ink compositions herein include a biodegradable wax. In embodiments, the biodegradable wax is a biodegradable polyethylene wax. For example, the wax can be a biodegradable polyethylene wax sold under the name Accumelt® 78, from IGI Waxes.

In embodiments, the phase change ink compositions herein further comprise a low melting wax. In embodiments, the low melting wax is a polyalkylene wax, a functional wax, or a combination thereof. The term "functional wax" is known to one of skill in the art and can mean herein any suitable functional wax, in embodiments, including, but not limited to, a wax with polar groups, for example, alcohols, amides, esters, urethanes, etc. As used herein, the term "low melting wax" includes any suitable low melting wax, including, in embodiments, a wax having a melting point of less than about 120° C.

Examples of suitable amides include, for example, diamides, triamides, tetra-amides, cyclic amides and the like. Suitable triamides include, for example, those disclosed in U.S. Pat. No. 6,860,930, the entire disclosure of which is incorporated herein by reference. Suitable other amides, such as fatty amides including monoamides, tetra-amides, and mixtures thereof, are disclosed in, for example, U.S. Pat. Nos. 4,889,560, 4,889,761, 5,194,638, 4,830,671, 6,174,937, 5,372,852, 5,597,856, and 6,174,937, and British Patent No. GB 2 238 792, the entire disclosures of each are incorporated herein by reference.

The wax can be present in the phase change ink composition in any suitable or desired amount. In embodiments, the wax is present in the phase change ink composition in an amount of from about 25 percent to about 65 percent by weight based on the total weight of the dye-based phase change ink composition. In embodiments, the wax is a low melting wax present in the phase change ink composition in an amount of from about 25% to less than about 65% by weight based on the total weight of the ink carrier.

Other suitable carrier materials that can be used in the phase change ink composition include isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, and 6,309,453, British Patents Nos. GB 2 294 939, GB 2 305 928, GB 2 305 670, and GB 2 290 793, and PCT Publications WO 94/14902, WO 97/12003, WO 97/13816, WO 96/14364, WO 97/33943, and WO 95/04760, the entire disclosures of each of which are incorporated herein by reference. In embodiments, the phase change ink composition can comprise a mixture of one or more amides and one or more isocyanate-derived materials.

Further examples of suitable ink vehicles include ethylene/propylene copolymers, such as those available from Baker Petrolite. Commercial examples of such copolymers include, for example, Petrolite CP-7 (Mn=650), Petrolite CP-11 (Mn=1,100, Petrolite CP-12 (Mn=1,200) and the like. The copolymers may have, for example, a melting point of from about 70° C. to about 150° C., such as from about 80° C. to about 130° C. or from about 90° C. to about 120° C. and a molecular weight range (Mn) of from about 500 to about 4,000.

Another type of ink vehicle may be n-paraffinic, branched paraffinic, and/or naphthenic hydrocarbons, typically with from about 5 to about 100, such as from about 20 to about 80 or from about 30 to about 60 carbon atoms, generally prepared by the refinement of naturally occurring hydrocarbons, such as BE SQUARE® 185 and BE SQUARE® 195, with molecular weights (Mn) of from about 100 to about 5,000, such as from about 250 to about 1,000 or from about 500 to about 800, for example such as available from Baker Petrolite.

Highly branched hydrocarbons, typically prepared by olefin polymerization, such as the VYBAR® materials available from Baker Petrolite, including VYBAR® 253 (Mn=520), VYBAR® 5013 (Mn=420), and the like, may also be used. In addition, the ink vehicle may be an ethoxylated alcohol, such as available from Baker Petrolite and of the general formula

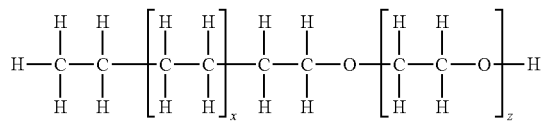

wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight (Mn) range of from about 100 to about 5,000, such as from about 500 to about 3,000 or from about 500 to about 2,500. Commercial examples include UNITHOX® 420 (Mn=560), UNITHOX® 450 (Mn=900), UNITHOX® 480 (Mn=2,250), UNITHOX® 520 (Mn=700), UNITHOX® 550 (Mn=1,100), UNITHOX® 720 (Mn=875), UNITHOX 750 (Mn=1,400), and the like.

As an additional example, the ink vehicle may be made of fatty amides, such as monoamides, tetra-amides, mixtures thereof, and the like, for example such as described in U.S. Pat. No. 6,858,070, which is hereby incorporated herein by reference. Suitable monoamides may have a melting point of at least about 50° C., for example from about 50° C. to about 150° C., although the melting point can be outside these ranges. Specific examples of suitable monoamides include, for example, primary monoamides and secondary monoamides. stearamide, such as KEMAMIDE® S available from Witco Chemical Company and CRODAMIDE® S available from Croda, behenamide/arachidamide, such as KEMAMIDE® B available from Witco and CRODAMIDE® BR available from Croda, oleamide, such as KEMAMIDE® U available from Witco and CRODAMIDE® OR available from Croda, technical grade oleamide, such as KEMAMIDE® 0 available from Witco, CRODAMIDE® 0 available from Croda, and UNISLIP® 1753 available from Uniqema, and erucamide such as KEMAMIDE® E available from Witco and CRODAMIDE® ER available from Croda, are some examples of suitable primary amides. Behenyl behenamide, such as KEMAMIDE® EX666 available from Witco, stearyl stearamide, such as KEMAMIDE® S-180 and KEMAMIDE® EX-672 available from Witco, stearyl erucamide, such as KEMAMIDE® E-180 available from Witco and CRODAMIDE® 212 available from Croda, erucyl erucamide, such as KEMAMIDE® E-221 available from Witco, oleyl palmitamide, such as KEMAMIDE® P-181 available from Witco and CRODAMIDE® 203 available from Croda, and erucyl stearamide, such as KEMAMIDE® S-221 available from Witco, are some examples of suitable secondary amides. Additional suitable amide materials include KEMAMIDE® W40 (N,N'-ethylenebisstearamide), KEMAMIDE® P181 (oleyl palmitamide), KEMAMIDE® W45 (N,N'-thylenebisstearamide), and KEMAMIDE® W20 (N,N'-ethylenebisoleamide).

In embodiments, the phase change ink composition includes (a) stearyl stearamide, (b) a dimer acid based tetra-amide that is the reaction product of dimer acid, ethylene diamine, and stearic acid, or (c) mixtures thereof. The phase change ink composition can include a mixture of one or more amides and one or more isocyanate-derived materials.

High molecular weight linear alcohols, such as those available from Baker Petrolite and of the general formula

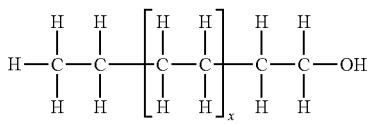

wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN® materials such as UNILIN® 425 (Mn=460), UNILIN® 550 (Mn=550), UNILIN® 700 (Mn=700), and distilled alcohols, the viscosity of which at the jetting temperature in one embodiment can be from about 5 to about 50% higher than the non-distilled alcohol.

A still further example includes hydrocarbon-based waxes, such as the homopolymers of polyethylene available from Baker Petrolite and of the general formula

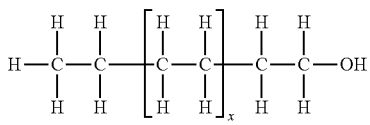

wherein x is an integer of from about 1 to about 200, such as from about to about 150 or from about 12 to about 105. These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include PW400 (Mn about 400), distilled PW400, in one embodiment having a viscosity of about 10% to about 100% higher than the viscosity of the undistilled POLYWAX® 400 at about 110° C., POLYWAX 500 (Mn about 500), distilled POLYWAX® 500, in one embodiment having a viscosity of about 10% to about 100% higher than the viscosity of the undistilled POLYWAX® 500 at about 110 C, POLYWAX 655 (Mn about 655), distilled POLYWAX® 655, in one embodiment having a viscosity of about 10% to about 50% lower than the viscosity of the undistilled POLYWAX® 655 at about 110° C., and in yet another embodiment having a viscosity of about 10% to about 50% higher than the viscosity of the undistilled POLYWAX® 655 at about 110° C. POLYWAX 850 (Mn about 850), POLYWAX 1000 (Mn about 1,000), and the like.

Another example includes modified maleic anhydride hydrocarbon adducts of polyolefins prepared by graft copolymerization, such as those available from Baker Petrolite and of the general formulas

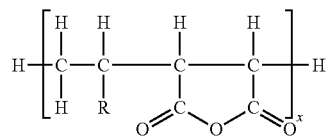

-continued

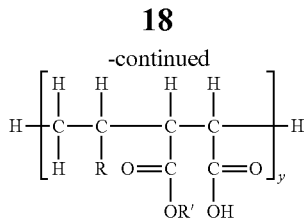

wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with from about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C.; and those available from Baker Petrolite and of the general formula

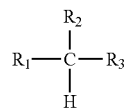

wherein $R_1$ and $R_3$ are hydrocarbon groups and $R_2$ is either of one of the general formulas

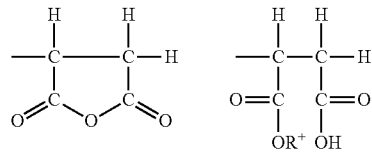

or a mixture thereof, wherein R' is an isopropyl group, which materials may have melting points of from about 70° C. to about 150° C., such as from about 80° C. to about 130° C. or from about 90° C. to about 125° C., with examples of modified maleic anhydride copolymers including CERAMER® 67 (Mn=655, Mw/Mn=1.1), CERAMER® 1608 (Mn=700, Mw/Mn=1.7), and the like.

Additional examples of suitable ink vehicles for the phase change inks include rosin esters; polyamides; dimer acid amides; fatty acid amides, including ARAMID® C; epoxy resins, such as EPOTUF® 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX® MH and KETJENFLEX® MS80; benzoate esters, such as BENZOFLEX® S552, available from Velsicol Chemical Company; phthalate plasticizers; citrate plasticizers; maleate plasticizers; sulfones, such as diphenyl sulfone, n-decyl sulfone, n-arnyl sulfone, chlorophenyl methyl sulfone; polyvinyl pyrrolidinone copolymers; polyvinyl pyrrolidone/polyvinyl acetate copolymers; novolac resins, such as DUREZ® 12 686, available from Occidental Chemical Company; and natural product waxes, such as beeswax, monton wax, candelilla wax, OILS ONITE® (American Gilsonite Company), and the like; mixtures of linear primary alcohols with linear long chain amides or fatty acid amides, such as those with from about 6 to about 24 carbon atoms, including PARICIN® 9 (propylene glycol monohydroxystearate), PARICIN® 13 (glycerol monohydroxystearate), PARICIN® 15 (ethylene glycol monohydroxystearate), PARICIN® 220 (N(2-hydroxyethyl)-12-hydroxystearamide), PARICIN® 285 (N,N'-ethylene-bis-12-hydroxystearamide), FLEXRICIN® 185 (N,N'-ethylene-bis-ricinoleamide), and the like. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink vehicle materials.

In addition, the ink vehicles described in U.S. Pat. No. 6,906,118, which is incorporated herein by reference in its entirety, may also be used. The ink vehicle may contain a branched triamide such as those described in U.S. Pat. No. 6,860,930, the disclosure of which is also incorporated by reference herein,

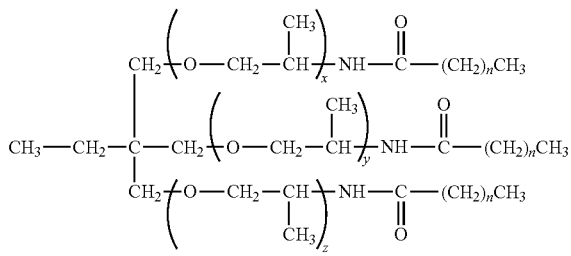

wherein n has an average value of from about 34 equal to or less than 40, where x, y and z can each be zero or an integer, and wherein the sum of x, y, and z is from about 5 and equal to or less than 6.

A rosin ester resin, mixtures thereof, or the like can also be included in the dye-based phase change ink composition. The rosin ester resin is present in any desired or effective amount, in embodiments from 0.5% to about 20% by weight of the total ink composition. Examples of suitable rosin ester resins include Pinecrystal KE-100 (commercially available from Arakawa), and the like.

In embodiments, the carrier is a member of the group consisting of paraffins, microcrystalline waxes, polyethylene waxes, polymethylene waxes, ester waxes, amide waxes, fatty acids, fatty alcohols, fatty amides, sulfonamide materials, tall oil rosins, rosin esters, ethylene/vinyl acetate copolymers, ethylene-acrylic acid copolymers/ethylene/vinyl acetate/acrylic acid copolymers, copolymers of acrylic acid with polyamides, ionomers, and mixtures thereof.

The phase change ink composition can include ink carrier comprising wax and other optional carrier components in any desired or effective amount, in one embodiment in an amount of at least about 50% to about 99 by total weight of the phase change ink composition, although the amount can be outside of this range. In certain embodiments, the ink carrier can be present in an amount of from about 25% to about 65% by total weight of the phase change ink composition.

Dispersant.

The phase change ink compositions herein can contain a dispersant. Any suitable or desired dispersant can be employed. In embodiments, the dispersant can be a dispersant described in U.S. Pat. No. 7,973,186 of Adela Goredema, et al., which is hereby incorporated by reference herein in its entirety. In specific embodiments, the dispersant is a compound of the formula

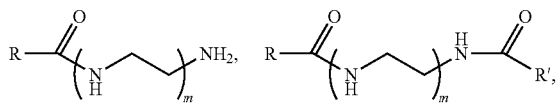

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

The dispersant can optionally be a polymeric dispersant such as those sold under the name Solsperse®, in embodiments, Solsperse® 1700, Solsperse® 13240, available from The Lubrizol Corporation.

The dispersant can be provided in the phase change ink composition in any suitable or desired amount. In embodiments, the dispersant can be present in an amount of from about 1 to about 500 percent, or from about 10 to about 300 percent, or from about 30 to about 200 percent total dispersant, based on the total weight of the pigment in the phase change ink composition.

Plasticizer.

Optionally, a plasticizer, which can be either a solid or liquid plasticizer, such as benzyl phthalates, triaryl phosphate esters, pentaerythritol tetrabenzoate, dialkyl adipate, dialkyl phthalates, dialkyl sebacate, alkyl benzyl phthalates, ethylene glycol monostearate, glycerol monostearate, propylene glycol monostearate, dicyclohexyl phthalate, diphenyl isophthalate, triphenyl phosphate, dimethyl isophthalate, and mixtures thereof, or the like can also be included in the ink carrier. The plasticizer is present in the ink carrier in any desired or effective amount, such as from about 0.05% by weight of the ink carrier. Examples of suitable plasticizers include SANTICIZER® 278, SANTICIZER® 154, SANTICIZER®160, SANTICIZER® 261 (commercially available from Monsanto), and the like or mixtures thereof.

Antioxidant.

The inks of the present disclosure can also optionally contain an antioxidant. The optional antioxidants of the ink compositions protect the inks from oxidation during the printing process and also protect the ink components from oxidation during the heating portion of the ink preparation process. Specific examples of suitable antioxidants include NAUGUARD® 524, NAUGUARD® 76, and NAUGUARD® 512, commercially available from Chemtura Corporation, Philadelphia, Pa., IRGANOX® 1010, commercially available from BASF, and the like. When present, the optional antioxidant is present in the ink in any desired or effective amount, such as from about 0.01 percent to about 20 percent by weight of the ink.

A hindered amine antioxidant can optionally be present in the ink in any desired or effective amount, such as from about 0.001 percent to about 0.50 percent by weight of the total ink composition.

Examples of suitable hindered amine antioxidants include those of general formula

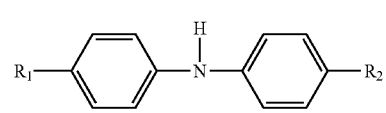

wherein $R_1$ and $R_2$ each, independently of the other, can be a hydrogen atom or an alkyl group, including linear, branched, saturated, unsaturated, cyclic, substituted, and unsubstituted alkyl groups, and wherein hetero atoms, such as oxygen, nitrogen, sulfur, silicon, phosphorus, boron, either may or may not be present in the alkyl group, in one embodiment with at least 1 carbon atom, if substituted, substitutions can be alkyl or phenyl.

Specific examples of suitable hindered amine antioxidants include the following antioxidants commercially available from Crompton; NAUGUARD® 445 where $R_1=R_2=C(CH_3)_2Ph$, NAUGUARD® 635 where $R_1=R_2=-CH(CH_3)Ph$, NAUGUARD® PS-30 where $R_1=C_4$ or $C_8$, $R_2=C_4$ or $C_8$ and the like.

A hindered phenol antioxidant can also be provided. In one embodiment the hindered phenol is present in a relatively high concentration. A high concentration of hindered phenol antioxidant maximizes long term thermal stability by delaying the onset of the oxidation itself. The hindered phenol antioxidant is present in the ink in any desired or effective amount, in embodiments from about 0.01% to about 4.0% by weight of the total ink composition. Specific examples of suitable hindered phenol antioxidants include ETHANOX® 330, ETHANOX® 310, ETHANOX® 314, ETHANOX® 376 (commercially available from Albemarle) and the like. Also commercially available from BASF are IRGANOX® 1010, IRGANOX® 1035, IRGANOX®1076, IRGANOX® 1330 and the like. Mixtures of two or more of these hindered phenol antioxidants can also be employed.

Viscosity Modifier.

The inks of the present disclosure can also optionally contain a viscosity modifier. Examples of suitable viscosity modifiers include aliphatic ketones, such as stearone, and the like, polymers such as polystyrene, polymethylmethacrylate, thickening agents, such as those available from BYK Chemie, and others. When present, the optional viscosity modifier is present in the ink in any desired or effective amount, such as from about 0.1 to about 60 percent by weight of the ink.

Additional Optional Additives.

Other optional additives can be included in the inks of the present disclosure including clarifiers, tackifiers, such as FORAL® 85, a glycerol ester of hydrogenated abietic (rosin) acid (commercially available from Eastman), FORAL® 105, a pentaerythritol ester of hydroabietic (rosin) acid (commercially available from Eastman), CELLOLYN® 21, a hydroabietic (rosin) alcohol ester of phthalic acid (commercially available from Eastman), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Cray Valley), and the like; adhesives, such as VERSAMID® 757, 759, or 744 (commercially available from Cognix), plasticizers, such as UNIPLEX® 250 (commercially available from Uniplex), the phthalate ester plasticizers commercially available from Ferro under the trade name SANTICIZER®, such as dioctyl phthalate, diundecyl phthalate, alkylbenzyl phthalate (SANTICIZER® 278), triphenyl phosphate (commercially available from Ferro), KP-140®, a tributoxyethyl phosphate (commercially available from Chemtura Corporation), MORFLEX® 150, a dicyclohexyl phthalate (commercially available from Vertellus Specialties Inc.), trioctyl trimellitate (commercially available from Eastman Kodak Co.), and the like. Such additives can be included in conventional amounts for their usual purposes. The optional additives may be present in any suitable or desired amount, such as from about 0.1 to about 50 percent by weight of the ink.

In one specific embodiment, the ink carrier has a melting point of less than about 110° C., and in another embodiment of less than about 100° C., although the melting point of the ink carrier can be outside of these ranges. The phase change ink compositions disclosed herein in one embodiment have melting points in one embodiment equal to or less than about 130° C., in another embodiment equal to or less than about 120° C., in a further embodiment equal to or less than about 110° C., and in still another embodiment equal to or less than about 100° C., although the melting point can be outside of these ranges.

The phase change ink compositions prepared by the process disclosed herein generally have melt viscosities, at the jetting temperature which can be equal to or less than about 145° C., in one embodiment equal to or less than about 130° C., and in another embodiment equal to or less than about 120° C., in a further embodiment equal to or less than about 110° C., and in yet another embodiment equal to or less than about 80° C., although the jetting temperature can be outside of these ranges, which are in one embodiment equal to or less than about 30 centipoise (cps), in another embodiment equal to or less than about 25 cps, and in yet a further embodiment equal to or less than about 20 cps, and in another embodiment no less than about 2 cps, in a further embodiment no less than about 3 cps, and in yet a further embodiment no less than about 4 cps, although the melt viscosity can be outside of these ranges.

In certain embodiments, the phase change ink composition herein has a jetting temperature of from about 100° C. to about 130° C.

In embodiments, the phase change ink composition herein has a viscosity of about 9 to about 12 centipoise at 110° C. In certain embodiments, the phase change ink composition herein has a viscosity of about 10 centipoise at 110° C.

In certain embodiments, the phase change ink composition herein comprises a composition wherein, for a given sample of the synergist, about 80 to about 90 percent of the sample has a volume average particle diameter of less than about 40 micrometers; wherein the synergist has a surface area of about 70 m²/gram; and wherein the synergist has a density of about 1.6 grams/cm³.

In certain embodiments, the phase change ink composition herein is a pigment phase change ink compositions wherein the pigment is a cyan pigment; wherein the carrier is a polyethylene wax; wherein the dispersant is a compound of the formula

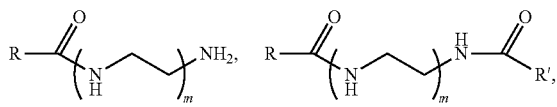

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30; and wherein, for a given sample of the synergist, about 80 to about 90 percent of the sample has a volume average particle diameter of less than about 40 micrometers; wherein the synergist has a surface area of about 70 m²/gram or about 0.56 m²/gram; and wherein the synergist has a density of about 0.78 gram/milliliter or about 1.6 grams/milliliter.

The phase ink compositions of the present disclosure can be prepared by any desired or suitable method. In embodiments, a method for preparing a phase change ink composition herein comprises combining a pigment, a carrier; a dispersant; and a synergist, (a) wherein, for a given sample of the synergist, about 80 to about 100 percent of the sample has a volume average particle diameter of about 50 to about 200 nanometers; (b) wherein the synergist has a surface area of about 30 to about 100 m²/gram; and (c) wherein the synergist has a density of above about 0.6 to about 2 grams/cm³, to produce a phase change ink composition.

For example, the ink ingredients can be mixed together, followed by heating, to a temperature of at least about 100° C. to no more than about 140° C., although the temperature can be outside of this range, and stirring until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

In embodiments, an ink jet printer stick or pellet herein contains a phase change ink composition comprising a pigment a carrier; a dispersant; and a synergist, (a) wherein, for a given sample of the synergist, about 80 to about 100 percent of the sample has a volume average particle diameter of about 5 to about 200 nanometers; (b) wherein the synergist has a surface area of about 30 to about 100 m²/gram; and (c) wherein the synergist has a density of above about 0.6 to about 2 grams/cm³.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

In embodiments, a method herein comprises incorporating into an ink jet printing apparatus a phase change ink composition comprising a pigment a carrier; a dispersant; and a synergist, (a) wherein, for a given sample of the synergist, about 80 to about 100 percent of the sample has a volume average particle diameter of about 5 to about 200 nanometers; (b) wherein the synergist has a surface area of about 30 to about 100 m²/gram; and (c) wherein the synergist has a density of above about 0.6 to about 2 grams/cm³; melting the ink composition; and causing droplets of the melted ink to be ejected in an imagewise pattern onto a substrate. In certain embodiments, the pigment is a cyan pigment; the carrier is a polyethylene wax; the dispersant is a compound of the formula

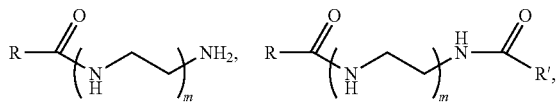

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30; and for a given sample of the synergist, about 80 to about 100 percent of the sample has a volume average particle diameter of less than about 200 nanometers; the synergist has a surface area of about 80 m²/gram; and wherein the synergist has a density of about 1.6 grams/cm³.

Any suitable substrate or recording sheet can be employed, including plain papers such as XEROX® 4024 papers, XEROX® Image Series papers, Courtland® 4024 DP® paper, ruled notebook paper, bond paper, silica coated papers such as Sharp Company silica coated paper, JuJo® paper, Hammermill® Laserprint Paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Formulations.

Ink concentrates were prepared using a Union Process Model 01 attritor, charged with 1,800 grams of ⅛" Grade 440C stainless steel media. Components of the concentrate vehicle were melted and stirred in a beaker until homogeneous, and then charged into the attritor. While stiffing at 100 revolutions per minute (rpm), the synergist powder was added over the course of about 2 to 3 minutes, followed by the pigment C.I. Pigment Blue 15:3, available from Clariant Corporation, which was added over the course of 5 minutes. The mixture was stirred at 100 rpm for 30 minutes to allow for sufficient wetting of the dry powders, and then the milling speed increased to 300 rpm for a period of about 72 hours. The resulting ink concentrate was then separated from the dispersion media by filtration.

Inks were prepared by adding a homogeneous molten diluent mixture to the aforementioned molten ink concentrate, which was stirred at 350 rpm using a magnetic stir bar. In each case below, the diluent mixture was comprised of KEMAMIDE® S-180 (stearyl stearamide, available from Crompton Corporation, 24.06 grams), KE100 (resin available from Arakawa Chemical Industries, 31.3 grams), Resin 6 (a triamide resin prepared as described in Example II of U.S. Pat. No. 6,860,930, which is hereby incorporated by reference herein in its entirety, 31.3 grams), Resin 12 (a plasticizer that is a urethane resin that is the adduct of three equivalents of stearyl isocyanate and a glycerol-based alcohol (prepared as described in Example IV of U.S. Pat. No. 6,309,453, which is hereby incorporated by reference herein in its entirety, 5.88 grams, Naugard® 445 (an aromatic amine antioxidant available from Crompton Corporation; 0.78 grams), and a polyethylene wax having an average peak molecular weight of from about 350 to about 730 grams per mole, a polydispersity of from about 1.03 to about 3.0, and an asymmetrical molecular weight distribution skewed toward the high molecular weight end, obtained from Baker Petrolite and modified as described in U.S. Pat. No. 7,407,539, which is hereby incorporated by reference herein in its entirety, 126.7 grams).

Example 1

An ink concentrate vehicle comprised of KEMAMIDE® S-180 (stearyl stearamide, stearyl stearamide, available from Crompton Corporation, 104.2 grams), and pigment dispersant (a polyethyleneimine dispersant as prepared in Example 1 of U.S. Pat. No. 7,973,186, which is hereby incorporated by reference herein in its entirety, 28.8 grams), to which was added the synergist Sunflo® SFD-B 124 (a derivatized sulfonated copper phthalocyanine, available from Sun Chemical, 3.0 grams), and the C.I. Pigment Blue 15:3 (available from Clariant Corporation, 24.0 grams).

To the stirred ink concentrate (30.0 grams) was slowly added a homogeneous molten mixture of the diluent (220.0 grams) described above. The resulting ink was stirred using a magnetic stir bar for a period of 1 hour at a temperature of 120° C.

Comparative Example 2

An ink concentrate vehicle comprised of KEMAMIDE® S-180 (stearyl stearamide, stearyl stearamide, available from Crompton Corporation, 104.2 grams), and pigment dispersant (a polyethyleneimine dispersant as prepared in Example 1 of U.S. Pat. No. 7,973,186, which is hereby incorporated by reference herein in its entirety, 28.8 grams), to which was added the synergist Solsperse® 5000 (a derivatized sulfonated copper phthalocyanine, available from Lubrizol Corporation, 3.0 grams), and the pigment C.I. Pigment Blue 15:3 (available from Clariant Corporation, 24.0 grams).

To the stirred ink concentrate (30.0 grams) was slowly added a homogeneous molten mixture of the diluent (220.0 grams) described above. The resulting ink was stirred using a magnetic stir bar for a period of 1 hour at a temperature of 120° C.

Comparative Example 3

An ink concentrate vehicle comprised of KEMAMIDE® S-180 (stearyl stearamide, available from Crompton Corporation, 104.2 grams), and Solsperse® 13240 (a polyethyleneimine dispersant available from Lubrizol Corporation, 28.8 grams), to which was added the synergist Solsperse® 5000 (a derivatized sulfonated copper phthalocyanine, available from Lubrizol Corporation, 3.0 grams), and the pigment C.I. Pigment Blue 15:3 (available from Clariant Corporation, 24.0 grams).

To the stirred ink concentrate (30.0 grams) was slowly added a homogeneous molten mixture of the diluent (220.0 grams) described above. The resulting ink was stirred using a magnetic stir bar for a period of 1 hour at a temperature of 120° C.

Comparative Example 4

An ink concentrate vehicle comprised of KEMAMIDE® S-180 (stearyl stearamide, stearyl stearamide, available from Crompton Corporation, 104.2 grams), and Solsperse® 13240 (a polyethyleneimine dispersant available from Lubrizol Corporation, 28.8 grams), to which was added the synergist Sunflo® SFD-B 124 (a derivatized sulfonated copper phthalocyanine, available from Sun Chemical, 3.0 grams), and the pigment C.I. Pigment Blue 15:3 (available from Clariant Corporation, 24.0 grams).

To the stirred ink concentrate (30.0 grams) was slowly added a homogeneous molten mixture of the diluent (220.0 grams) described above. The resulting ink was stirred using a magnetic stir bar for a period of 1 hour at a temperature of 120° C.

Particle Size.

The pigmented solid inks herein possess a suitable particle size and particle size stability at elevated temperatures. Dynamic light scattering is a commonly used metric for determining particle size. Measurement of the particle size of the molten ink immediately after filtration, and then again after a period of days gives a good indication of the stability of the ink. High energy ink processing can result in size reduction of the pigment particles to less than about 150 nanometers, or less than about 120 nanometers. Unstable systems will re-agglomerate, resulting in significant increases in particle size upon aging. This can eventually lead to particle sedimentation, which is detrimental to print quality and can damage the print head performance.

Particle size was measured for neat inks using a Malvern Zeta Sizer® HT at 100° C. Measurements were made on the day of preparation and then again on subsequent days. The ink was stored undisturbed in an oven at 120° C. between measurements. Following is a comparison of particle size stability of Example 1, an ink in accordance with an embodiment of the present disclosure having a Sunflo® StD-B124/dispersant system, Comparative Ink Example 2 made with a Solsperse® 5000/dispersant system, Comparative Ink Example 3 made with a Solsperse® 5000/Solsperse® 13240 dispersant system, and Comparative Ink Example 4, made with a Sunflo® SFD-B124/Solsperse® 13240 dispersant system. The ink in Example 1 enjoys stable particle size over a period of 20 days, while the other three inks show significant signs of particle growth. The ink in Comparative Ink Example 4 displayed visual settling after standing undisturbed at 120° C. for two days, thus no further particle size measurements were made.

TABLE 1

Example 1 - Particle Size Stability

| | | Particle Size (Nanometers) | | |
|---|---|---|---|---|
| Days Aged at 120 ®C | Z Average Particle Size | D(50) | D(95) | PDI |
| 0 | 113 | 128 | 262 | 0.244 |
| 6 | 113 | 134 | 270 | 0.228 |
| 13 | 112 | 134 | 274 | 0.249 |
| 20 | 114 | 134 | 281 | 0.243 |

TABLE 2

Comparative Example 2 - Particle Size Stability

| | | Particle Size (Nanometers) | | |
|---|---|---|---|---|
| Days Aged at 120 ®C | Z Average Particle Size | D(50) | D(95) | PDI |
| 0 | 203 | 216.17 | 1861.00 | 0.46 |
| 1 | 182 | 204.50 | 422.33 | 0.36 |

TABLE 2-continued

Comparative Example 2 - Particle Size Stability

| Days Aged at 120 °C | Z Average Particle Size | Particle Size (Nanometers) | | |
|---|---|---|---|---|
| | | D(50) | D(95) | PDI |
| 5 | 208 | 230.67 | 609.33 | 0.44 |
| 7 | 207 | 241.17 | 571.67 | 0.40 |

TABLE 3

Comparative Example 3 - Particle Size Stability

| Days Aged at 120 °C | Z Average Particle Size | Particle Size (Nanometers) | | |
|---|---|---|---|---|
| | | D(50) | D(95) | PDI |
| 0 | 144 | 157 | 400 | 0.24 |
| 2 | 147 | 169 | 345 | 0.20 |
| 8 | 172 | 190 | 440 | 0.22 |

TABLE 4

Comparative Example 4 - Particle Size Stability

| Days Aged at 120 °C | Z Average Particle Size | Particle Size (Nanometers) | | |
|---|---|---|---|---|
| | | D(50) | D(95) | PDI |
| 0 | 172 | 198 | 508 | 0.25 |

Figure 2:
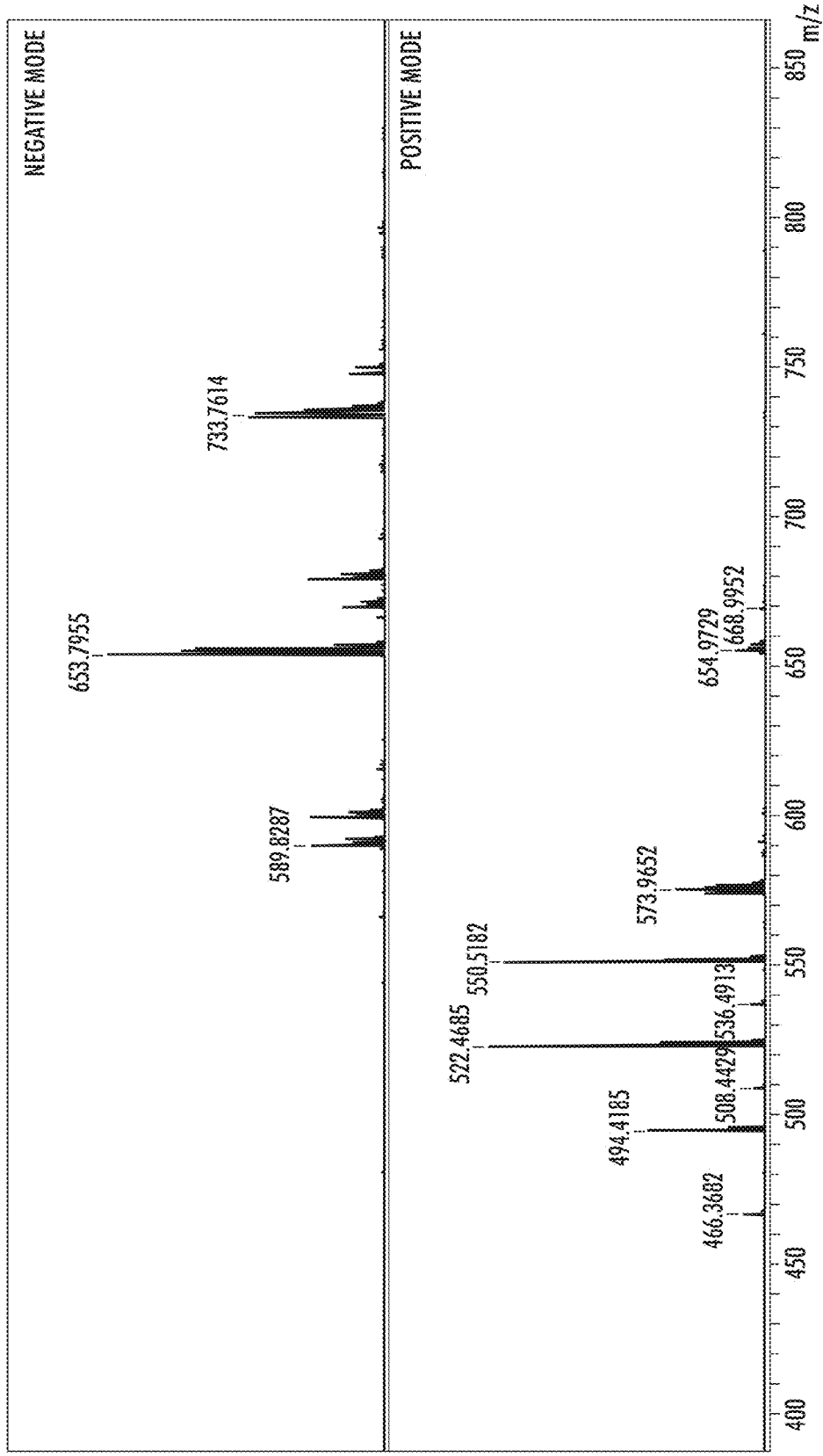
FIG. 2 is graph showing a MALDI-TOF analysis of a comparative synergist used for comparative pigmented phase change inks.

FIG. 1 illustrates matrix-assisted laser desorption/ionization time of flight analysis results (MALDI-ToF) for a synergist suitable for pigmented phase change inks in accordance with the present disclosure comprising the synergist used in Comparative Example 4. FIG. 2 illustrates MALDI-TOF analysis of the comparative synergist used in Comparative Example 3. MALDI-ToF analysis of the synergist used in Comparative Example 4 and the synergist used in Comparative Example 3 shows them to have the same structure, a mixture of mono-, di-, and unsubstituted copper phthalocyanines, as well as the same counter ion. Furthermore, X-Ray Powder Diffraction Analysis (XRD) revealed that both pigments were largely of the same polymorph. Based on these analyses, one would expect the two materials to yield very similar performance in solid ink formulations. However, the present inventors have surprisingly discovered that the pigmented phase change ink compositions of the present disclosure including the synergist selected as described herein provides unexpected improved pigmented phase change ink compositions. Differences were observed in density and BET Surface Area for the two synergists as shown in Table 5 below.

TABLE 5

| | BET Surface Area (m²/g) | Density (g/mL) |
|---|---|---|
| Sunflo ® SFD-B124 | 0.56 | 0.78 |
| Solsperse ® 5000 | 3.73 | 0.43 |

Particle size, as seen by transmission electron microscopy (TEM), was also found to be different; wide distributions were found in both cases, but the average size of the Sunflo® SFD-B 124 material was smaller.

Figure 3:
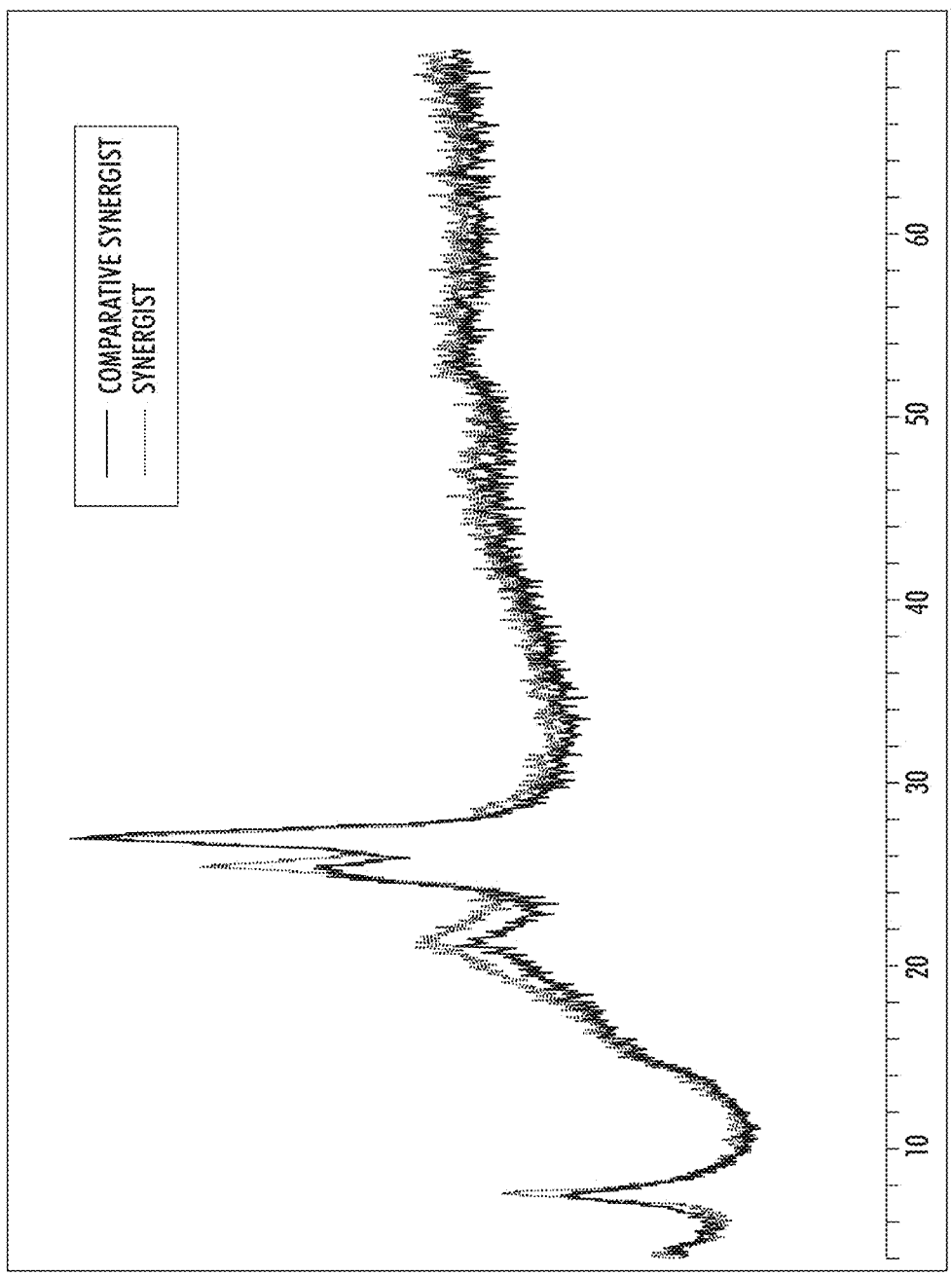
FIG. 3 is a graph showing x-ray diffraction analysis for a synergist suitable for pigmented phase change inks in accordance with the present disclosure and a comparative synergist.

FIG. 3 provides an x-ray diffraction analysis for a synergist suitable for pigmented phase change inks in accordance with the present disclosure comprising the synergist used in Example 1 and the comparative synergist used in Comparative Example 3.

Figure 4:
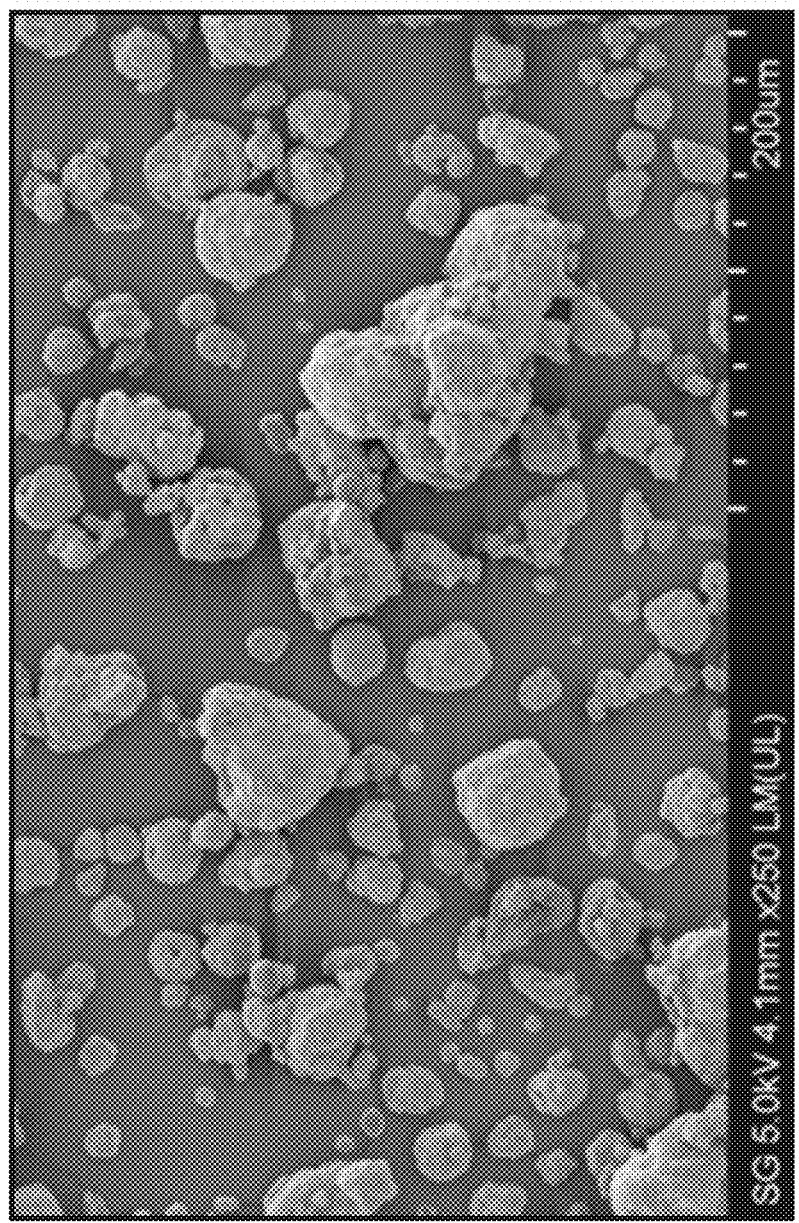
FIG. 4 is a transmission electron microscopy micrograph of a synergist suitable for pigmented phase change inks in accordance with the present disclosure.

FIG. 4 is a transmission electron microscopy micrograph of a synergist suitable for pigmented phase change inks in accordance with the present disclosure comprising the synergist used in Example 4.

Figure 5:
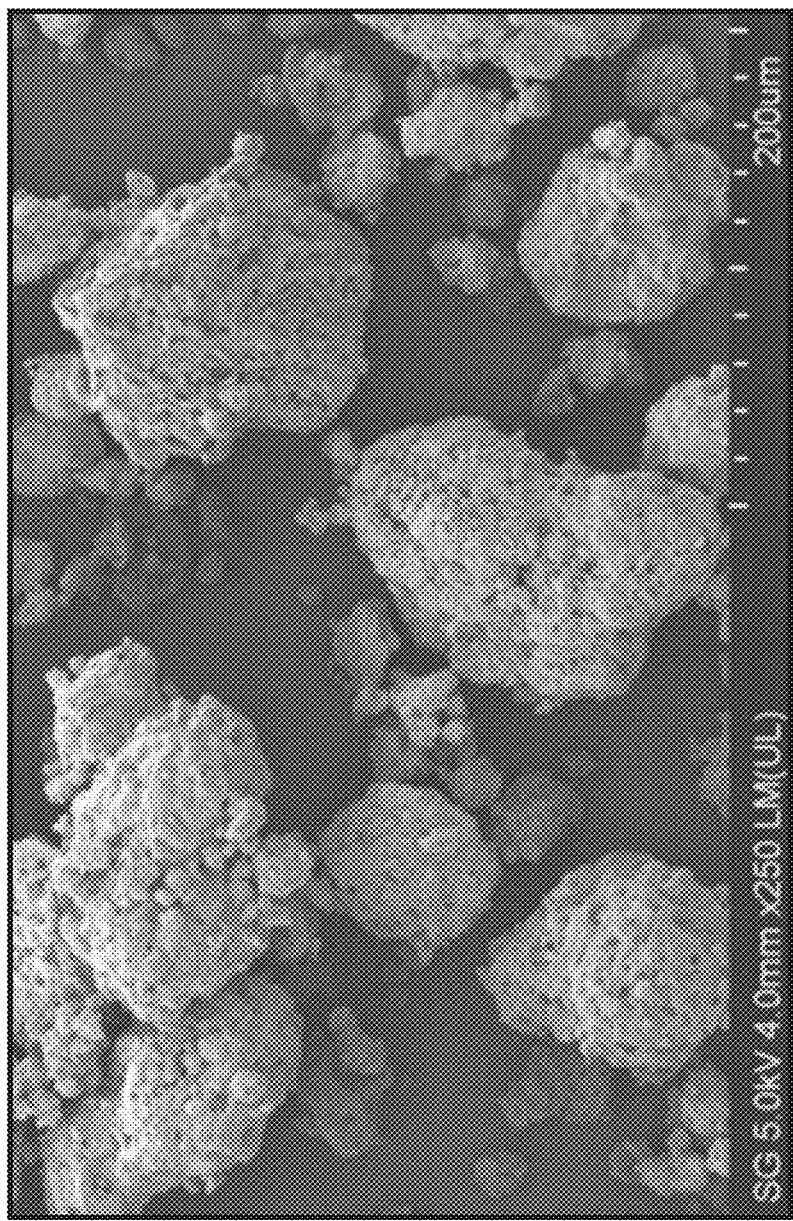
FIG. 5 is a transmission electron microscopy micrograph of a comparative synergist.

FIG. 5 is a transmission electron microscopy micrograph of the comparative synergist used in Comparative Example 3.

Banding.

The ultimate test for particle size stability is measured within the printer itself. Settling of the particles within the capillaries leading to the jet stack can result in a print quality defect known as banding. Due to the pathway leading to the print heads, settled particles will affect only the jets nearest the ink feeders. This can manifest itself on a solid area fill print as narrow bands having low optical density. Allowing a somewhat unstable ink to stand undisturbed in the molten state in the print head can result in this failure. This represents a very stringent test for settling of a pigmented ink. In very bad cases, the failure will appear within a short number of days, such as 2 days or even hours. In less severe cases, the bands will only appear after several days of standing.

Testing of Ink Example 1 was done for both 3 and 10 days. A solid area print was made using freshly filtered ink. After 3 days standing undisturbed in the printer, a second solid area print was made; no difference could be seen in the two prints. This was therefore assigned a rating of 0 on a scale from 0 to 5. After a further 10 days standing undisturbed, light bands could be seen in the new solid area print. This was assigned a rating of 2 on a scale from 0 to 5. This represented a very significant improvement in the banding rating of pigmented cyan solid inks over previously available pigmented cyan solid inks, and particularly inks made with an identical formulation, but having Solsperse® 5000 as a synergist rather than Sunflo® SFD-B124. The ink of Comparative Example 2 was assigned a banding rating of 4 after 10 days. The ink of Comparative Example 3 was assigned a banding rating of 5 after 10 days. The ink of Comparative Example 4 was assigned a banding rating of 4 after 10 days.

Figure 6:
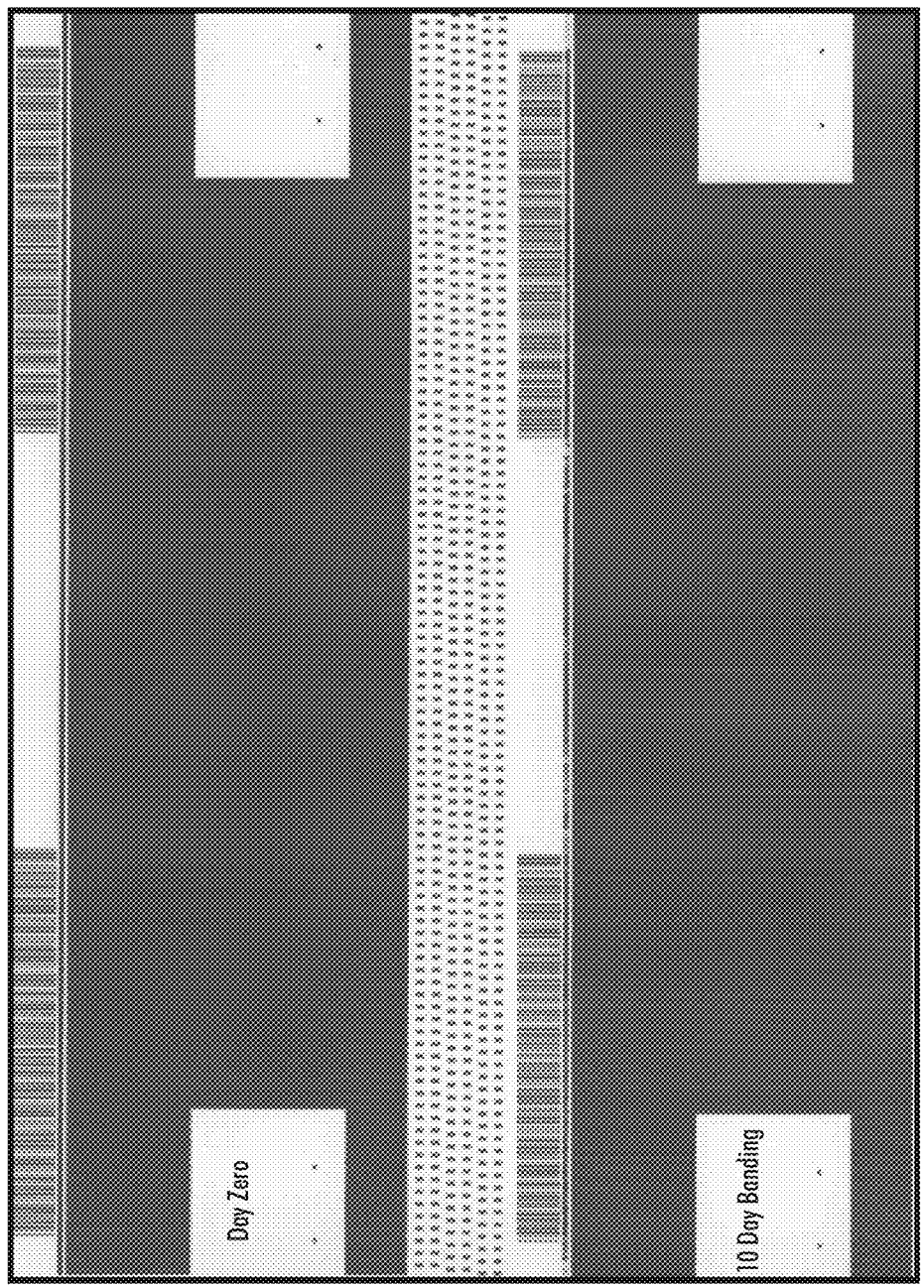
FIG. 6 is an illustration of banding test results for a pigmented phase change ink in accordance with the present disclosure.

FIG. 6 shows 10 day banding test results for the ink of Example 1.

In embodiments, the phase change ink composition of the present disclosure has a stable particle size when aged at 120° C. over a period of at least 20 days.

In embodiments, the phase change ink composition of the present disclosure has a banding test rating of 0 for a banding test comprising (a) printing a first solid area print using freshly filter phase change ink composition as described herein; (b) printing a second solid area print with a phase change ink composition as described herein that had been left standing undisturbed in a printer for 3 days, and (c) visually comparing the first solid area print and second solid area print and assigning a rating using a scale of 0 to 5, with 0 meaning no banding observed and 5 meaning extreme banding observed.

In embodiments, the phase change ink composition of the present disclosure has a banding test rating of no greater than 2 for a banding test comprising (a) printing a first solid area print using freshly filter phase change ink composition as described herein; (b) printing a second solid area print with a phase change ink composition as described herein that had been left standing undisturbed in a printer for 10 days, and (c) visually comparing the first solid area print and second solid area print and assigning a rating using a scale of 0 to 5, with 0 meaning no banding observed and 5 meaning extreme banding observed.

In embodiments, a phase change ink containing a synergist for pigment dispersion is provided. In certain embodiments, a particular combination of synergist (for example, Sunflo® SFD-B124) and pigment dispersant is provided for pigmented solid inks. The particular combination of components was provided improved stability characteristics over previous phase change inks, in embodiments improved stability characteristics over previous pigmented phase change inks.

It will be appreciated that various of the above-disclosed embodiments and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink composition comprising:
    a pigment;
    a carrier;
    a dispersant; and
    a synergist, (a) wherein, for a given sample of the synergist, about 80 to about 100 percent of the sample has a volume average particle diameter of about 50 to about 200 nanometers; (b) wherein the synergist has a surface area of about 30 to about 100 m²/gram; and (c) wherein the synergist has a density of above about 0.6 to about 2 grams/cm³.

2. The phase change ink composition of claim 1, wherein the pigment is selected from the group consisting of metal phthalocyanine, metal-free phthalocyanine, and mixtures and combinations thereof.

3. The phase change ink composition of claim 1, wherein the pigment is selected from the group consisting of cyan, green, blue, black, carbon black, C.I. Pigment Blue 15:0, C.I Pigment Blue 15:1, C.I. Pigment Blue 15:2, C.I. Pigment Blue 15:3, C.I. Pigment Blue 15:4, C.I. Pigment Blue 15:5, C.I. Pigment Blue 15:6, C.I. Pigment Green 7, C.I. Pigment Green 36, C.I. Pigment Black 7, copper phthalocyanine, and mixtures and combinations thereof.

4. The phase change ink composition of claim 1, wherein the carrier is a member of the group consisting of paraffins, microcrystalline waxes, polyethylene waxes, polymethylene waxes, ester waxes, amide waxes, fatty acids, fatty alcohols, fatty amides, sulfonamide materials, tall oil rosins, rosin esters, ethylene/vinyl acetate copolymers, ethylene-acrylic acid copolymers/ethylene/vinyl acetate/acrylic acid copolymers, copolymers of acrylic acid with polyamides, ionomers, and mixtures thereof.

5. The phase change ink composition of claim 1, wherein the dispersant a compound of the formula

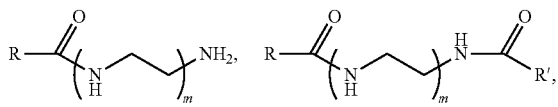

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

6. The phase change ink composition of claim 1, wherein, for a given sample of the synergist, about 80 to about 90 percent of the sample has a volume average particle diameter of less than about 40 micrometers;
    wherein the synergist has a surface area of about 70 m²/gram; and
    wherein the synergist has a density of about 1.6 grams/cm³.

7. The phase change ink composition of claim 1, wherein the synergist is a compound of the formula

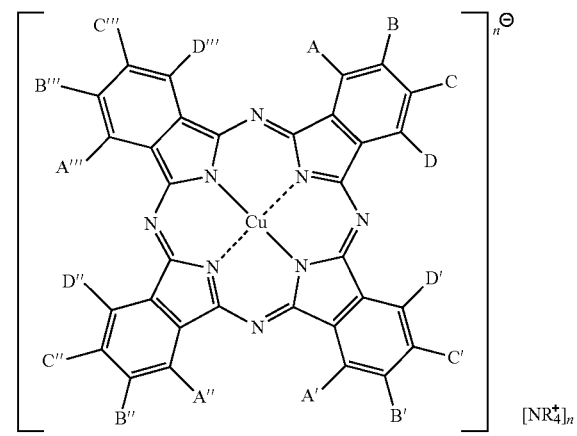

wherein A, B, C, and D, A', B', C', and D', A", B", C", and D", A''', B''', C''', and D''', are each independently selected from the group consisting of hydrogen, SO₃H, and SO₃⁻, and wherein the synergist comprises a mixture of compounds wherein n is a mixture of from 0, 1, 2, 3, 4, or greater, or wherein n is a mixture of 0, 1, and 2.

8. The phase change ink composition of claim 1, wherein the phase change ink composition has a stable particle size when aged at 120° C. over a period of at least 20 days.

9. The phase change ink composition of claim 1, wherein the phase change ink composition has a banding test rating of 0 for a banding test comprising (a) printing a first solid area print using freshly filter phase change ink composition of claim 1; (b) printing a second solid area print with a phase change ink composition of claim 1 that had been left standing undisturbed in a printer for 3 days, and (c) visually comparing the first solid area print and second solid area print and assigning a rating using a scale of 0 to 5, with 0 meaning no banding observed and 5 meaning extreme banding observed.

10. The phase change ink composition of claim 1, wherein the phase change ink composition has a banding test rating of no greater than 2 for a banding test comprising (a) printing a first solid area print using freshly filter phase change ink composition of claim 1; (b) printing a second solid area print with a phase change ink composition of claim 1 that had been left standing undisturbed in a printer for 10 days, and (c) visually comparing the first solid area print and second solid area print and assigning a rating using a scale of 0 to 5, with 0 meaning no banding observed and 5 meaning extreme banding observed.

11. A method for preparing a phase change ink composition comprising:

combining a pigment, a carrier; a dispersant; and a synergist, (a) wherein, for a given sample of the synergist, about 80 to about 100 percent of the sample has a volume average particle diameter of about 50 to about 200 nanometers; (b) wherein the synergist has a surface area of about 30 to about 100 m²/gram; and (c) wherein the synergist has a density of above about 0.6 to about 2 grams/cm³, to produce a phase change ink composition.

12. The method of claim 11, wherein the dispersant a compound of the formula

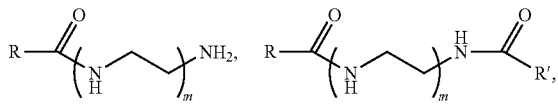

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

13. The method of claim 11, wherein the synergist is a compound of the formula

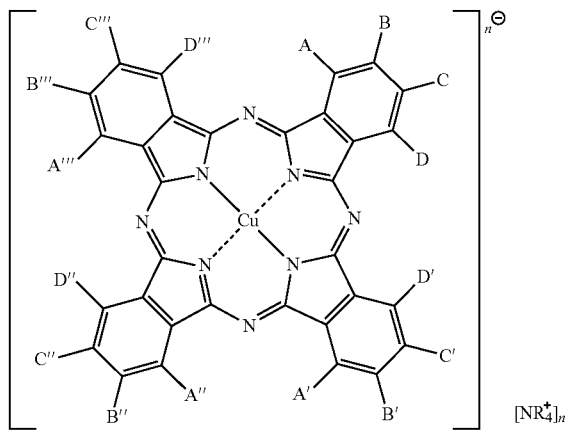

wherein A, B, C, and D, A', B', C', and D', A", B", C", and D", A''', B''', C''', and D''', are each independently selected from the group consisting of hydrogen, $SO_3H$, and $SO_3^-$, and wherein the synergist comprises a mixture of compounds wherein n is a mixture of from 0, 1, 2, 3, 4, or greater, or wherein n is a mixture of 0, 1, and 2.

14. A method comprising:
incorporating into an ink jet printing apparatus a phase change ink composition comprising a pigment a carrier; a dispersant; and a synergist, (a) wherein, for a given sample of the synergist, about 80 to about 100 percent of the sample has a volume average particle diameter of about 50 to about 200 nanometers; (b) wherein the synergist has a surface area of about 30 to about 100 m²/gram; and (c) wherein the synergist has a density of above about 0.6 to about 2 grams/cm³;
melting the ink composition; and
causing droplets of the melted ink to be ejected in an imagewise pattern onto a substrate.

15. The method of claim 14, wherein the dispersant a compound of the formula

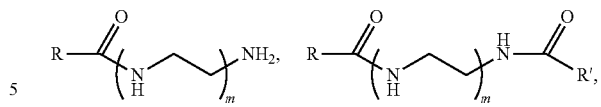

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

16. The method of claim 14, wherein the synergist is a compound of the formula

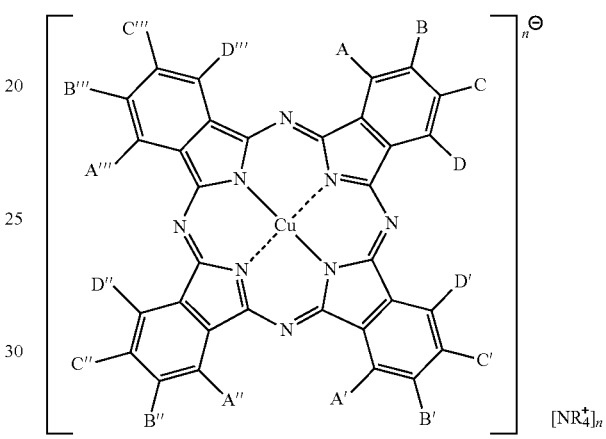

wherein A, B, C, and D, A', B', C', and D', A", B", C", and D", A''', B''', C''', and D''', are each independently selected from the group consisting of hydrogen, $SO_3H$, and $SO_3^-$, and wherein the synergist comprises a mixture of compounds wherein n is a mixture of from 0, 1, 2, 3, 4, or greater, or wherein n is a mixture of 0, 1, and 2.

17. An ink jet printer stick or pellet containing a phase change ink composition comprising a pigment a carrier; a dispersant; and a synergist, (a) wherein, for a given sample of the synergist, about 80 to about 100 percent of the sample has a volume average particle diameter of about 50 to about 200 micrometers; (b) wherein the synergist has a surface area of about 30 to about 100 m²/gram; and (c) wherein the synergist has a density of above about 0.6 to about 2 grams/cm³.

18. The ink jet printer stick or pellet of claim 17, wherein the dispersant a compound of the formula

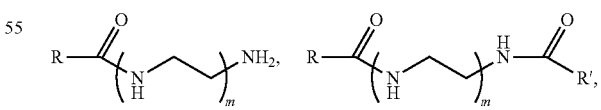

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

19. The ink jet printer stick or pellet of claim 17, wherein the synergist is a compound of the formula

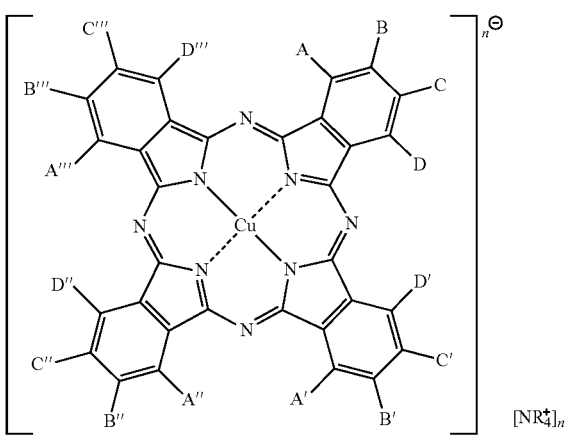

wherein A, B, C, and D, A', B', C', and D', A", B", C", and D", A'", B'", C'", and D'", are each independently selected from the group consisting of hydrogen, $SO_3H$, and $SO_3^-$, and wherein the synergist comprises a mixture of compounds wherein n is a mixture of from 0, 1, 2, 3, 4, or greater, or wherein n is a mixture of 0, 1, and 2.

20. The ink jet printer stick or pellet of claim 17, wherein the carrier is a member of the group consisting of paraffins, microcrystalline waxes, polyethylene waxes, polymethylene waxes, ester waxes, amide waxes, fatty acids, fatty alcohols, fatty amides, sulfonamide materials, tall oil rosins, rosin esters, ethylene/vinyl acetate copolymers, ethylene-acrylic acid copolymers/ethylene/vinyl acetate/acrylic acid copolymers, copolymers of acrylic acid with polyamides, ionomers, and mixtures thereof.

* * * * *